United States Patent
Asai et al.

(10) Patent No.: US 12,510,601 B2
(45) Date of Patent: Dec. 30, 2025

(54) SECONDARY BATTERY DETERIORATION DEGREE DETERMINATION DEVICE

(71) Applicant: DENSO CORPORATION, Kariya (JP)

(72) Inventors: Tomomi Asai, Kariya (JP); Nobuo Yamamoto, Kariya (JP); Hiroyasu Suzuki, Kariya (JP); Katsuki Hayashi, Kariya (JP); Yuya Minabe, Kariya (JP)

(73) Assignee: DENSO CORPORATION, Kariya (JP)

( * ) Notice: Subject to any disclaimer, the term of this patent is extended or adjusted under 35 U.S.C. 154(b) by 201 days.

(21) Appl. No.: 18/068,828

(22) Filed: Dec. 20, 2022

(65) Prior Publication Data

US 2023/0118311 A1 Apr. 20, 2023

Related U.S. Application Data

(63) Continuation of application No. PCT/JP2021/022683, filed on Jun. 15, 2021.

(30) Foreign Application Priority Data

Jun. 30, 2020 (JP) .................................. 2020-113172

(51) Int. Cl.
*G01R 31/392* (2019.01)
*B60R 16/033* (2006.01)
(Continued)

(52) U.S. Cl.
CPC .......... *G01R 31/392* (2019.01); *B60R 16/033* (2013.01); *G01R 31/3835* (2019.01);
(Continued)

(58) Field of Classification Search
CPC ................ G01R 31/392; G01R 31/396; G01R 31/3835; H02J 7/00712; B60R 16/033; H01M 10/482; H01M 10/42; H01M 10/44
See application file for complete search history.

(56) References Cited

U.S. PATENT DOCUMENTS

| | | |
|---|---|---|
| 2012/0004798 A1 | 1/2012 | Sakamoto et al. |
| 2013/0030739 A1 | 1/2013 | Takahashi et al. |

(Continued)

FOREIGN PATENT DOCUMENTS

| | | |
|---|---|---|
| EP | 3657190 A1 | 5/2020 |
| JP | 2012016163 A | 1/2012 |

(Continued)

*Primary Examiner* — Christopher E Mahoney
(74) *Attorney, Agent, or Firm* — Harness, Dickey & Pierce, P.L.C.

(57) ABSTRACT

A deterioration degree determination device includes a charging and discharging control unit, a battery characteristic acquisition unit, and a determination unit. The charging and discharging control unit, in a state where multiple secondary batteries are connected to each other to form a battery pack, performs a charging and discharging operation of the battery pack while voltages of the secondary batteries are individually measured. The battery characteristic acquisition unit acquires a battery characteristic related to transition in a battery state over a predetermined voltage section for at least some of the multiple secondary batteries. The determination unit determines a deterioration degree of at least some of the multiple secondary batteries based on the battery characteristic or a battery characteristic relationship value calculated based on the battery characteristic.

13 Claims, 24 Drawing Sheets

(51) Int. Cl.
    *G01R 31/3835*     (2019.01)
    *G01R 31/396*     (2019.01)
    *H01M 10/48*     (2006.01)
    *H02J 7/00*     (2006.01)

(52) U.S. Cl.
    CPC ........ *G01R 31/396* (2019.01); *H01M 10/482* (2013.01); *H02J 7/0047* (2013.01); *H02J 7/00712* (2020.01)

(56) References Cited

U.S. PATENT DOCUMENTS

| | | |
|---|---|---|
| 2013/0099794 A1 | 4/2013 | Takahashi et al. |
| 2014/0019001 A1 | 1/2014 | Nishizawa |
| 2014/0028321 A1* | 1/2014 | Bourgeois .......... G01R 31/3835 324/426 |
| 2014/0218042 A1 | 8/2014 | Koba et al. |
| 2014/0336964 A1 | 11/2014 | Okumura et al. |
| 2015/0147614 A1 | 5/2015 | Wang et al. |
| 2015/0207347 A1* | 7/2015 | Hori .................... H01M 10/482 320/128 |
| 2016/0195590 A1* | 7/2016 | Kosugi ............... H01M 10/486 340/636.19 |
| 2018/0372805 A1* | 12/2018 | Fischer ................ G01R 31/396 |
| 2020/0225292 A1 | 7/2020 | Ukumori et al. |
| 2021/0075225 A1* | 3/2021 | Fukaya ............... H01M 10/482 |
| 2023/0118313 A1 | 4/2023 | Asai et al. |
| 2023/0122626 A1 | 4/2023 | Asai et al. |

FOREIGN PATENT DOCUMENTS

| | | |
|---|---|---|
| JP | 5259443 B2 | 8/2013 |
| WO | WO-2011125213 A1 | 10/2011 |
| WO | WO-2012133212 A1 | 10/2012 |
| WO | WO-2012137456 A1 | 10/2012 |
| WO | WO-2013115038 A1 | 8/2013 |

* cited by examiner

FIG. 2
(a)
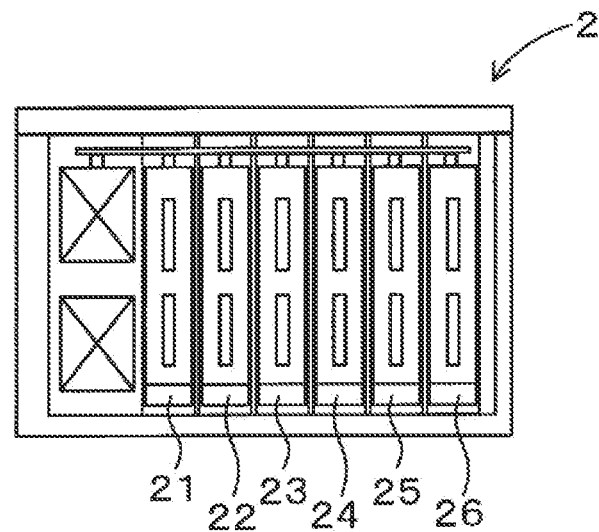
(b)
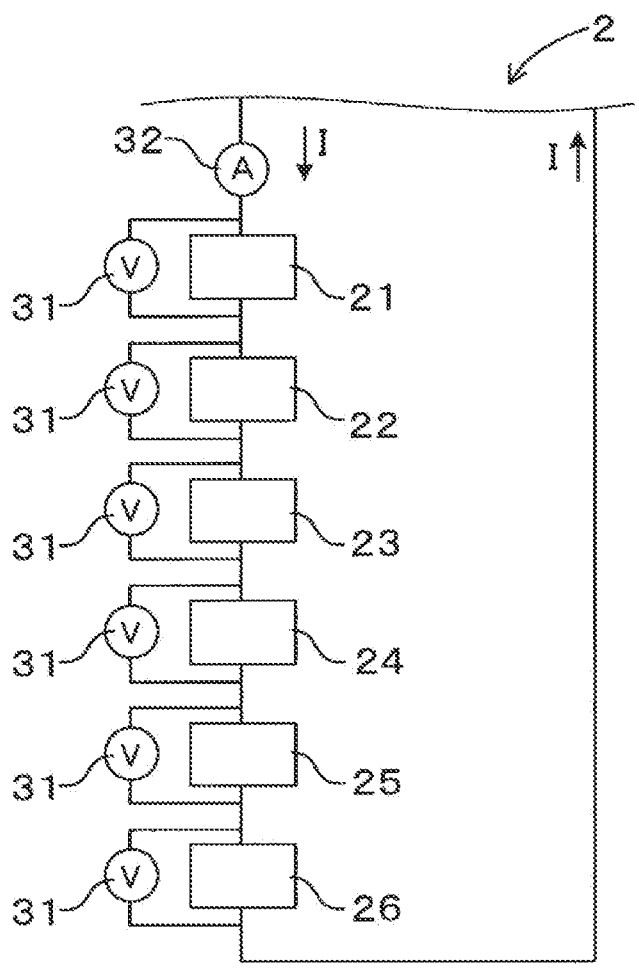

FIG. 19
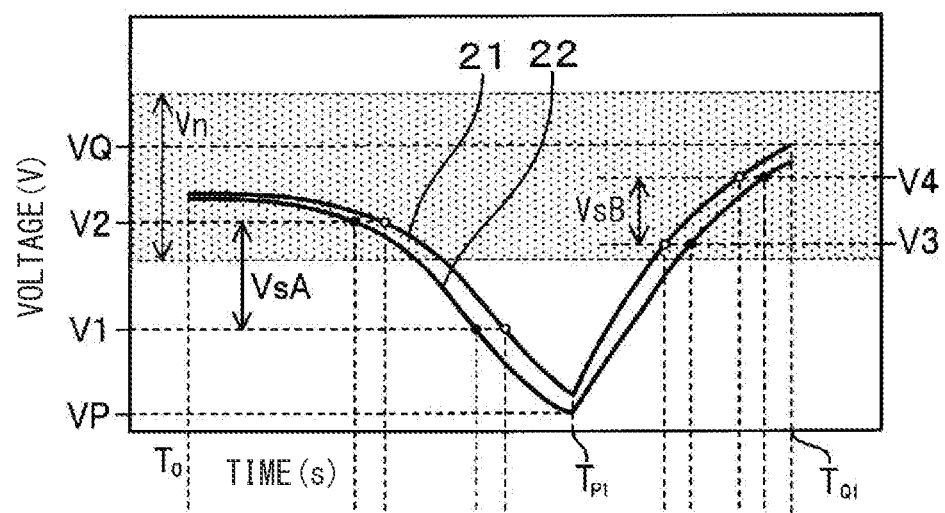
(a)
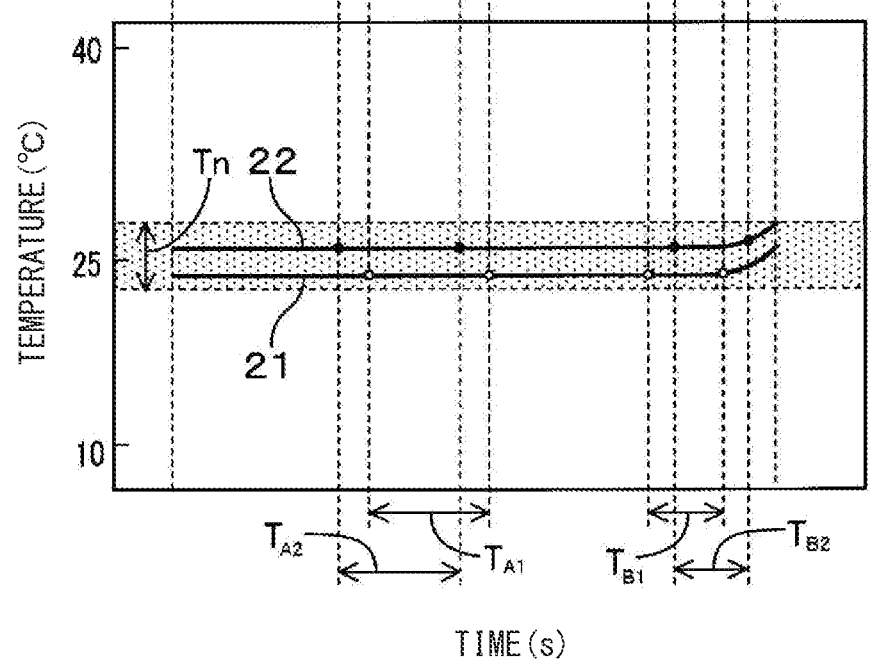
(b)

FIG. 24
(a)
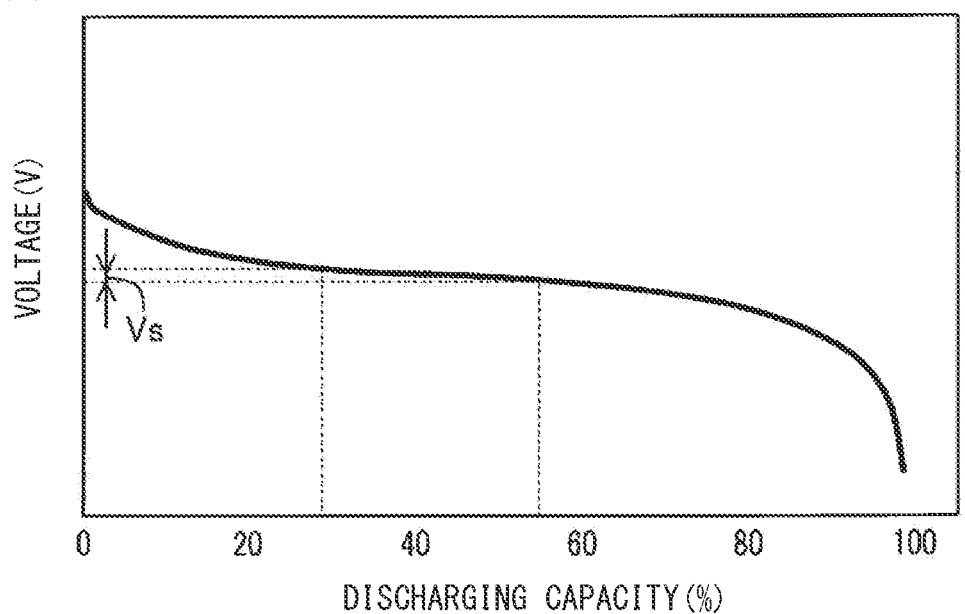
(b)
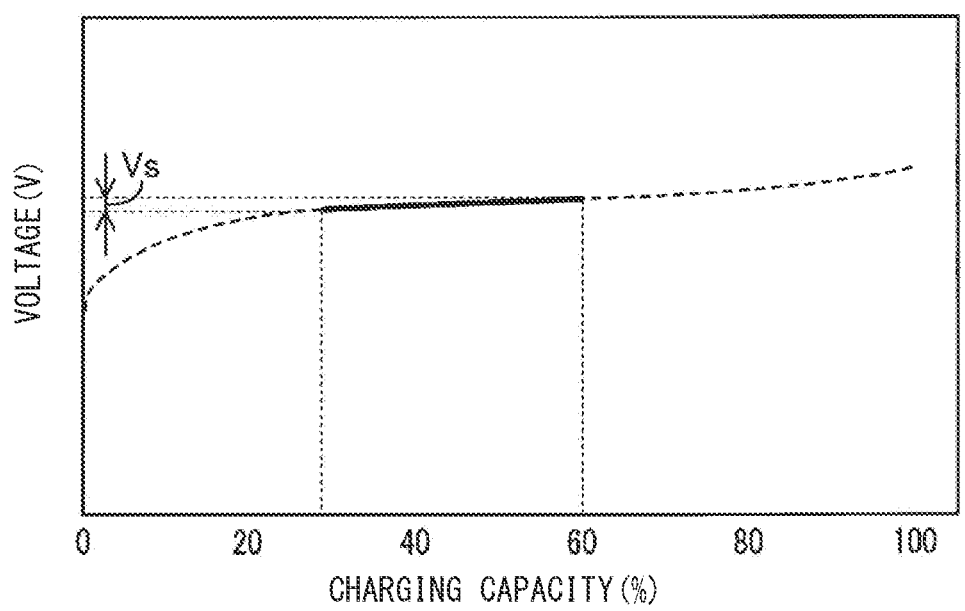

FIG. 28
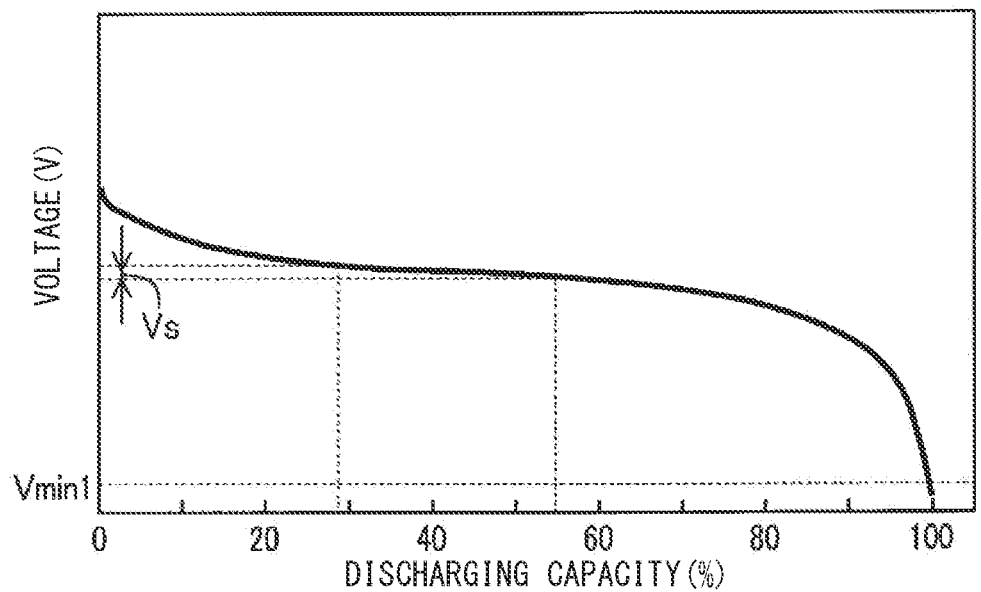
(a)
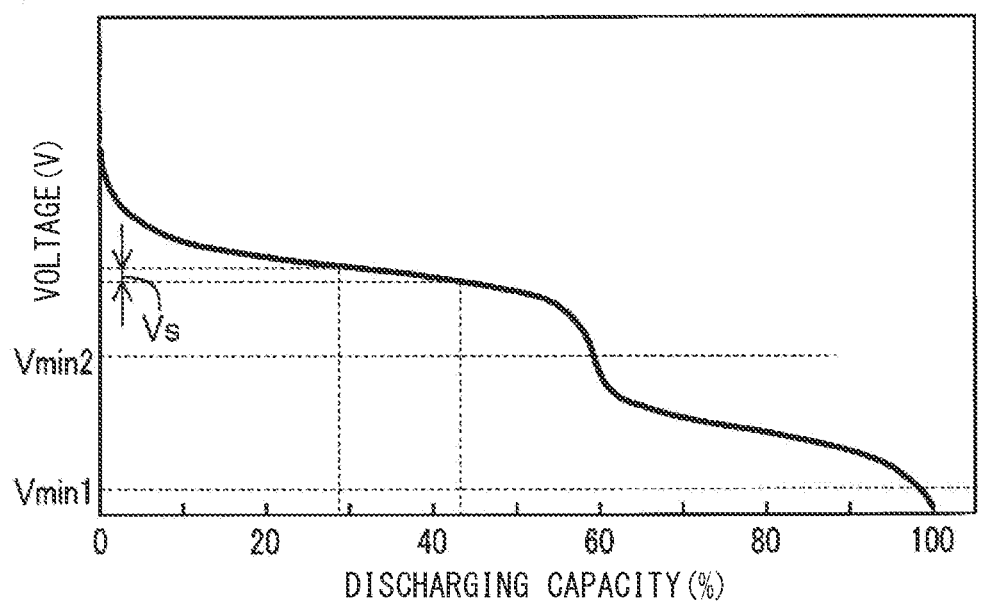
(b)

SECONDARY BATTERY DETERIORATION DEGREE DETERMINATION DEVICE

CROSS REFERENCE TO RELATED APPLICATIONS

The present application is a continuation application of International Patent Application No. PCT/JP2021/022683 filed on Jun. 15, 2021, which designated the U.S. and claims the benefit of priority from Japanese Patent Application No. 2020-113172 filed on Jun. 30, 2020. The entire disclosures of all of the above applications are incorporated herein by reference.

TECHNICAL FIELD

The present disclosure relates to a deterioration degree determination device for a secondary battery.

BACKGROUND

It has been known to diagnose the deterioration degree of a secondary battery that deteriorates with use. For example, it has been known a configuration related to deterioration diagnosis of a battery forming a power storage unit mounted on a vehicle. In the configuration, in a service mode for diagnosing deterioration, the rechargeable capacity of a battery is determined by discharging the battery until the remaining capacity of the battery reaches zero and then charging the battery until the battery is fully charged, such that the deterioration diagnosis of the battery is performed.

SUMMARY

The present disclosure describes a secondary battery deterioration degree determination device. According to an aspect of the present disclosure, a secondary battery deterioration degree determination device includes a charging and discharging control unit, a battery characteristic acquisition unit, and a determination unit. The charging and discharging control unit, in a state where a plurality of secondary batteries are connected to each other to form a battery pack, performs a charging and discharging operation of the battery pack while voltages of the secondary batteries are individually measured. The battery characteristic acquisition unit acquires a battery characteristic related to transition in a battery state over a predetermined voltage section for at least some of the plurality of secondary batteries. The determination unit that determines a deterioration degree of the secondary battery of at least some of the plurality of secondary batteries based on the battery characteristic or a battery characteristic relationship value calculated based on the battery characteristic.

BRIEF DESCRIPTION OF DRAWINGS

Objects, features and advantages of the present disclosure will become more apparent from the following detailed description with reference to the accompanying drawings. In the drawings:

FIG. 2 is a conceptual diagram showing a configuration of a battery pack in the embodiment 1;

FIG. 19 is a conceptual diagram showing a battery characteristic in the embodiment 5;

FIG. 24 is a conceptual diagram showing (a) a discharging curve of the secondary battery and (b) a charging curve of the secondary battery in the embodiment 6;

FIG. 28 is a conceptual diagram showing (a) a discharging curve of the secondary battery and (b) another discharging curve of the secondary battery in the embodiment 9;

DETAILED DESCRIPTION

Figure 1:
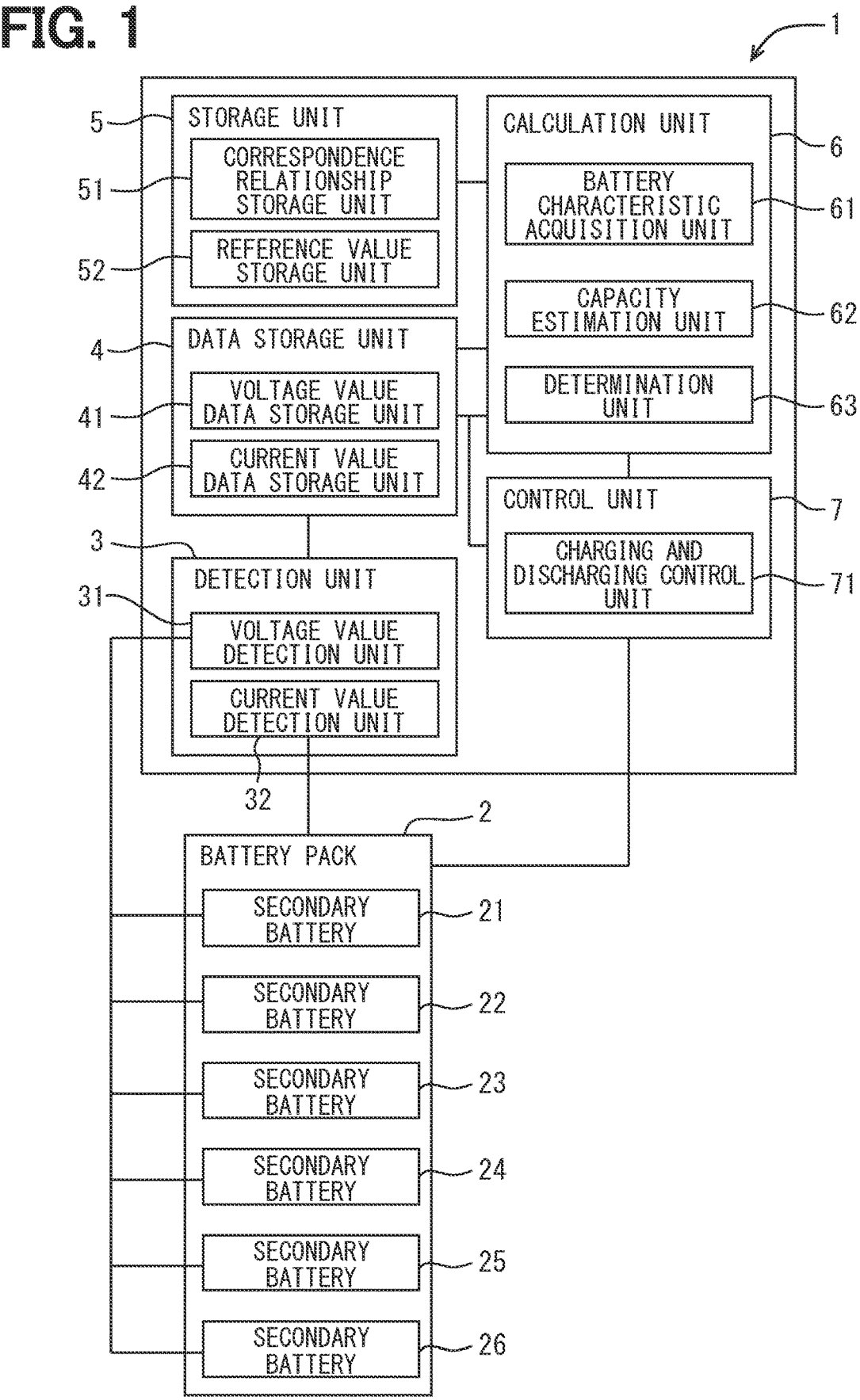
FIG. 1 is a conceptual diagram showing a configuration of a deterioration degree determination device in an embodiment 1.

When a battery is configured with a battery pack including multiple secondary batteries, the deterioration degree of each secondary battery may vary with the use of the battery. Therefore, although the deterioration degree of some of the secondary batteries of the battery exceeds a reference, the deterioration degree of the battery as a whole is high, and determination may be made that the battery cannot be used. Therefore, in the battery determined to be unusable, the deterioration degree of some of the secondary batteries only may exceed the reference, and the deterioration degree of other secondary batteries may be low. Therefore, in order to improve the reuse rate of the secondary battery, the secondary battery having a high deterioration degree may be removed and the battery pack may be reused as a rebuilt product in which the battery pack is reconstructed from the batteries having a low deterioration degree. Therefore, the improvement of the utilization rate of the secondary battery can be attempted by acquiring the deterioration degree of the individual secondary battery forming the battery pack.

In a method in related art, in order to determine the individual deterioration degree of the multiple secondary batteries provided in the battery pack, it is necessary to make determination individually in a state where the individual secondary battery is taken out from the battery pack, such that in determining the deterioration degree of multiple secondary batteries contained in the vehicle-purpose battery, first, the battery is removed from the vehicle, furthermore, the secondary battery is taken out from the battery, and then it is necessary to connect the individual secondary battery to a deterioration degree determination device, an electric load, and the like. Therefore, the work of determining the deterioration degree is complicated, and the workload is high.

The present disclosure provides a secondary battery deterioration degree determination device capable of reducing a load of determination work of a deterioration degree of the secondary battery forming a battery pack.

According to an aspect of the present disclosure, a secondary battery deterioration degree determination device includes: a charging and discharging control unit, in a state where multiple secondary batteries are connected to each other to form a battery pack, that performs a charging and discharging operation of the battery pack while voltages of the secondary batteries are individually measured; a battery characteristic acquisition unit that acquires a battery characteristic related to transition in a battery state over a predetermined voltage section for at least some of the multiple secondary batteries; and a determination unit that determines a deterioration degree of the secondary battery of at least some of the multiple secondary batteries based on the battery characteristic or a battery characteristic relationship value calculated based on the battery characteristic.

In the above-mentioned secondary battery deterioration degree determination device, the charging and discharging operation is performed in a state where multiple secondary batteries are connected to each other to form the battery pack, and for at least some of the secondary batteries, the battery characteristic related to the transition in the battery state over the predetermined voltage section is acquired. The deterioration degree of at least some of the secondary batteries is determined based on the battery characteristic or the battery characteristic relationship value calculated based on the battery characteristic. Accordingly, the deterioration degree of at least some of the secondary batteries can be determined without removing the secondary batteries from the battery pack. When the deterioration degree is determined, the multiple secondary batteries forming the battery pack are already connected to each other, and thus there is no need to take out the secondary battery from the battery pack and wire the individual secondary battery to a deterioration degree determination device. Therefore, workability when the deterioration degree of the secondary battery is determined can be improved.

As described above, according to the above aspect, the secondary battery deterioration degree determination device which is capable of improving workability when the deterioration degree of the secondary batteries forming the battery pack is determined, can be provided.

Hereinafter, multiple embodiments of the present disclosure will be described with reference to the drawings.

Embodiment 1

An embodiment of a secondary battery deterioration degree determination device will be described with reference to FIGS. 1 to 7.

The secondary battery deterioration degree determination device 1 of the present embodiment includes a charging and discharging control unit 71, a battery characteristic acquisition unit 61, and a determination unit 63.

The charging and discharging control unit 71 charges and discharges a battery pack 2 while individually measuring the voltages of secondary batteries 21 to 26 in a state where multiple secondary batteries 21 to 26 are connected to each other to form the battery pack 2.

The battery characteristic acquisition unit 61 acquires a battery characteristic related to the transition of a battery state over a predetermined voltage section for at least some of the multiple secondary batteries 21 to 26.

The determination unit 63 determines the deterioration degree of at least some of the multiple secondary batteries 21 to 26 based on the battery characteristic or a battery characteristic relationship value calculated based on the battery characteristic.

Hereinafter, the deterioration degree determination device 1 for the secondary battery of the present embodiment will be described in detail.

The deterioration degree determination device 1 shown in FIG. 1 can set the secondary batteries 21 to 26 forming the battery pack 2 as a determination target. The "secondary battery" is a rechargeable battery and includes a battery configured with a single cell or multiple cells. The "battery pack" refers to a battery pack in which the multiple the secondary batteries are electrically connected to each other. In the present embodiment, the types of the secondary batteries 21 to 26 are not limited, and known secondary batteries such as nickel-metal hydride batteries and lithium ion batteries can be targeted, and may have a single cell or multiple cells. In the present embodiment, as shown in (a) in FIG. 2, the secondary batteries 21 to 26 form a secondary battery module that is a module that can be individually attachable and detachable. The number of secondary batteries provided in the battery pack 2 is not particularly limited, and is six in the present embodiment. As shown in (b) in FIG. 2, the secondary batteries 21 to 26 are connected in series. When the secondary batteries 21 to 26 form an individually detachable module and the cells are connected in parallel in the module, the corresponding modules may be connected in parallel.

As shown in FIG. 1, the deterioration degree determination device 1 includes a detection unit 3, a storage unit 4, a memory unit 5, a calculation unit 6, and a control unit 7.

The detection unit 3 includes a voltage value detection unit 31 and a current value detection unit 32. The voltage value detection unit 31 is configured with a predetermined voltmeter, and as shown in (b) in FIG. 2, detects the voltage value of the individual secondary batteries 21 to 26 in the battery pack 2. The current value detection unit 32 is configured with a predetermined ammeter, is connected to the secondary batteries 21 to 26, and acquires the current value flowing through the secondary batteries 21 to 26. The open circuit voltage of the secondary batteries 21 to 26 is configured to be acquired based on the voltage value detected by the voltage value detection unit 31.

The storage unit 4 shown in FIG. 1 is configured with a rewritable non-volatile memory, and includes a voltage value storage unit 41 and a current value storage unit 42. The voltage value storage unit 41 stores the voltage value detected by the voltage value detection unit 31, and the current value storage unit 42 stores the current value detected by the current value detection unit 32.

A memory unit 5 shown in FIG. 1 is configured with a non-volatile memory, and includes a correspondence relationship memory unit 51 and a reference value memory unit 52. The correspondence relationship memory unit 51 stores the correspondence relationship between the battery characteristic and a total capacity. The form of the corresponding correspondence relationship is not particularly limited, and can be, for example, a calculation formula, a map, a graph, and a table. The corresponding correspondence relationship can be created by machine learning using the measurement-purpose secondary battery, or created based on the actual measurement value obtained by performing an accelerated deterioration test by using the measurement-purpose secondary battery, or created by a calculation formula that logically derives the correspondence relationship between the battery characteristic and the total capacity in a predetermined voltage section by using the model of the secondary battery. The correspondence relationship stored in the correspondence relationship memory unit 51 is appropriately set according to the battery characteristic acquired by the battery characteristic acquisition unit 61 described later.

The above-mentioned total capacity can be the capacity from a fully discharged state to a fully charged state in the charging time. Alternatively, the total capacity can be the capacity from the fully charged state to the fully discharged state in the discharging time. The fully discharged state may be an effective fully discharged state defined by a system such as a vehicle on which the battery pack 2 is mounted, and may be a state in which the lower limit voltage set by the user who uses the deterioration degree determination device 1 has been reached. The fully charged state may be an effective fully charged state defined by the system such as the vehicle and the like, or may be a state in which the upper limit voltage specified by the user has been reached.

In the reference value memory unit 52 shown in FIG. 1, a reference value for determining the deterioration degree used in the determination unit 63 described later is stored in advance. The reference value is appropriately set according to the mode of determination by the determination unit 63, and in the present embodiment, multiple reference values are set such that the deterioration degree can be divided into five stages and determined.

Figure 3:
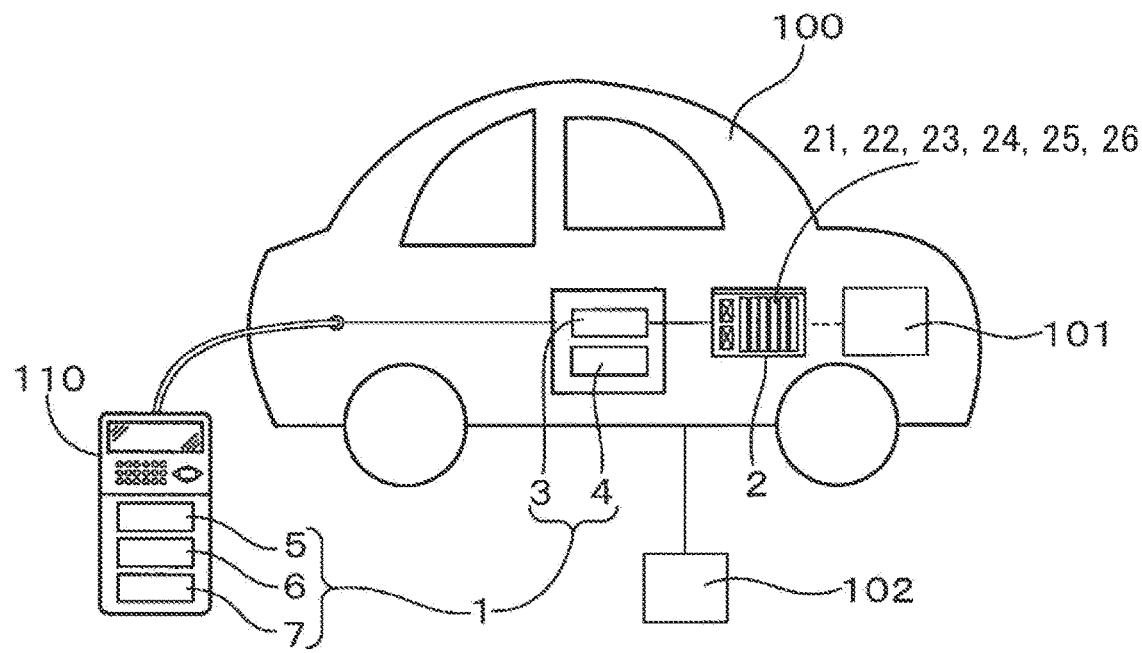
FIG. 3 is a conceptual diagram showing a usage state of the deterioration degree determination device in the embodiment 1.

The control unit 7 shown in FIG. 1 includes a charging and discharging control unit 71. The charging and discharging control unit 71 controls charging and discharging to charge and discharge the battery pack 2, that is, causes a charging and discharging operation of the battery pack 2, while individually measuring the voltages of the secondary batteries 21 to 26 by the voltage value detection unit 31. Accordingly, the secondary batteries 21 to 26 forming the battery pack 2 are simultaneously charged and discharged in a state of forming the battery pack 2. Accordingly, as shown in FIG. 3, the deterioration degree of each of the secondary batteries 21 to 26 can be determined without taking out the secondary batteries 21 to 26 from the battery pack 2 in a state of being still mounted on the vehicle 100. When the deterioration degree is determined in a state of being mounted on the vehicle 100, the charging and discharging control unit 71 can discharge the secondary batteries 21 to 26 by using an in-vehicle electrical device 101 such as an air conditioner and a headlight mounted on the vehicle 100 as shown in FIG. 3 or forcibly charges the secondary batteries 21 to 26 by regeneration by the engine or an external charging device 102 connected to the vehicle. The secondary batteries 21 to 26 may be charged and discharged by a serviceman driving the vehicle 100 brought into a service station or by using the chassis dynamometer provided in the service station. In the present disclosure, "charging and discharging" by the charging and discharging control unit 71, that is, the charging and discharging operation of the battery pack 2 by the charging and discharging control unit 71 includes any of a case of only charging, a case of only discharging, a case of discharging and then charging, and a case of charging and then discharging.

Figure 4:
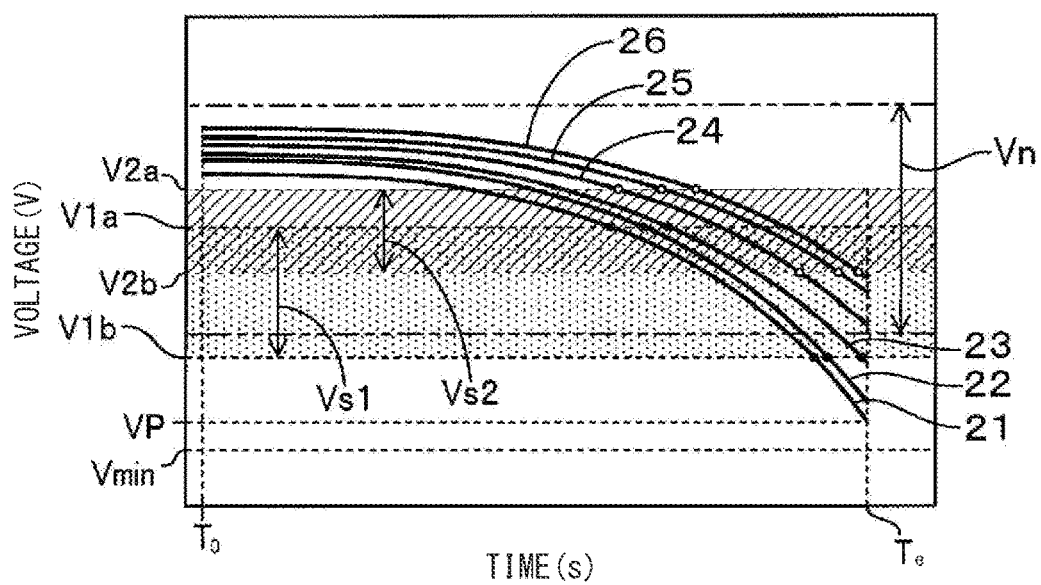
FIG. 4 is a conceptual diagram showing a battery characteristic in the embodiment 1.

In the present embodiment, the charging and discharging control unit 71 can perform discharging until any one of the secondary batteries 21 to 26 forming the battery pack 2 reaches a preset discharging target voltage VP or perform charging until a preset charging target voltage is reached. In the present embodiment, as shown in FIG. 4, the charging and discharging control unit 71 continues discharging until the voltage of the first secondary battery 21 reaches the discharging target voltage VP. In the present embodiment, the discharging target voltage VP is set outside a normal use range Vn, and the charging and discharging control unit 71 is configured to allow deviation from the normal use range Vn when the secondary batteries 21 to 26 are charged and discharged. The normal use range is a voltage range allowed when the secondary batteries 21 to 26 are used, and is appropriately set in advance according to the configuration of the secondary batteries 21 to 26, the configuration of the battery pack 2, and the like.

Figure 5:
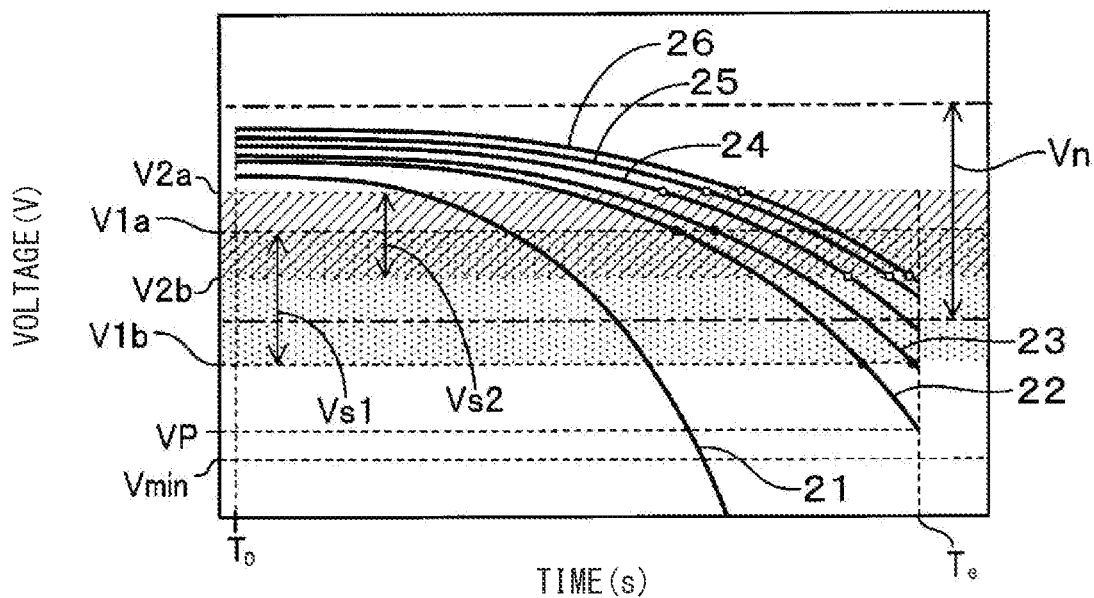
FIG. 5 is another conceptual diagram showing the battery characteristic in the embodiment 1.

When any of the secondary batteries 21 to 26 exceeds the discharging target voltage at an early stage and reaches a usage limit lower limit Vmin, any of the other secondary batteries 21 to 26 is continuously discharged until the discharging target voltage is reached. For example, as shown in FIG. 5, the first secondary battery 21 exceeds the discharging target voltage VP and reaches the usage limit lower limit Vmin at an early stage, and thus any of the other secondary batteries 22 to 26 is continuously discharged until the discharging target voltage is reached. A usable range is a voltage range preset as a range that does not cause over-discharging or over-charging in the secondary batteries 21 to 26. The usage limit lower limit Vmin indicates the lower limit of the usable range set in advance in the secondary batteries 21 to 26.

The calculation unit 6 shown in FIG. 1 is configured with a predetermined arithmetic device, and includes the battery characteristic acquisition unit 61, a capacity estimation unit 62 as an estimation unit, and the determination unit 63. The battery characteristic acquisition unit 61 acquires the battery characteristic of the secondary batteries 21 to 26. The battery characteristic of the secondary batteries 21 to 26 can be, for example, a characteristic based on the voltage transition and the temperature transition of the secondary batteries 21 to 26 in a predetermined voltage section Vs. The battery characteristic acquisition unit 61 may acquire the absolute value of the acquired value as the battery characteristic. The predetermined voltage section Vs in which the battery characteristic of the secondary batteries 21 to 26 is acquired can be set for each of the secondary batteries 21 to 26, or can be appropriately changed.

The battery states of the secondary batteries 21 to 26 forming the battery pack 2 are not always uniform, and the variation in the battery states increases with the use of the battery pack 2. Therefore, the voltage transition in the same voltage section also differs according to the deterioration state. The corresponding voltage transition, for example, can be calculated based on at least one of the section capacity of the secondary batteries 21 to 26 in the predetermined voltage section, the ratio of the voltage change of the secondary batteries 21 to 26 with respect to the capacity change of the secondary batteries 21 to 26 in the predetermined voltage section, and the ratio of the voltage change of the secondary batteries 21 to 26 with respect to the elapsed time in the predetermined voltage section. The predetermined voltage section can be a voltage section in which the deterioration degree of the secondary batteries 21 to 26 and the transition of the battery state show a correlation. Such a voltage section can be set based on the type and configuration of the secondary batteries 21 to 26, or can be derived by machine learning using the secondary battery.

In the present embodiment, as shown in FIG. 4, in the multiple secondary batteries 21 to 26 forming the battery pack 2, the secondary batteries 21 to 23 are set with a first voltage section Vs1 from a voltage V1$a$ to a voltage V1$b$, and the secondary batteries 24 to 26 are set with a second voltage section Vs2 from a voltage V2$a$ to a voltage V2$b$ different from the first voltage section. In the multiple secondary batteries 21 to 26 forming the battery pack 2, the first secondary battery 21, the second secondary battery 22 and the third secondary battery 23 are set in the voltage section Vs1 common to each other, and the fourth secondary battery 24, the fifth secondary battery 25, and the sixth secondary battery 26 are set in the voltage section Vs2 common to each other.

In the present embodiment, the discharging voltage characteristic is used as the battery characteristic. The discharging voltage characteristic is calculated based on the voltage transition when the battery pack 2 is discharged. The voltage transition when the battery pack 2 is discharged is different for each of the secondary batteries 21 to 26. In the present embodiment, as shown in FIG. 4, when the first secondary battery 21 and the fourth secondary battery 24 among the secondary batteries 21 to 26 are compared, the voltage of the first secondary battery 21 is lower than the voltage of the fourth secondary battery 24 at the discharging start time T0, and at the discharging end time Te, the voltage of the first secondary battery 21 drops to a value close to the usage limit lower limit Vmin. On the other hand, the voltage of the fourth secondary battery 24 gradually decreases from the discharging start time T0 to the discharging end time Te, but is higher than the voltage of the first secondary battery 21 at any time and maintains a value sufficiently higher than the usage limit lower limit Vmin even at the discharging end time Te.

As shown in FIG. 4, the battery characteristic acquisition unit 61 calculates the first battery characteristic in the first voltage section Vs1 from the voltage V1$a$ to the voltage V1$b$ with respect to the first secondary battery 21. On the other hand, in the fourth secondary battery 24, the voltage transition of a portion of the first voltage section Vs1 is not acquired, and thus the battery characteristic in the first voltage section Vs1 cannot be acquired. Therefore, with respect to the fourth secondary battery 24, the battery characteristic acquisition unit 61 selects the voltage section Vs2 from the voltage V2$a$ to the voltage V2$b$ as a section in which the battery characteristic can be acquired from the voltage section acquired until the discharging end time Te, and calculates the second battery characteristic in the second voltage section Vs2.

The battery characteristic acquisition unit 61 acquires the battery characteristic of the other secondary batteries 22 and 23 based on the voltage transition in the first voltage section Vs1 like the first secondary battery 21, and acquires the battery characteristic of the other secondary batteries 25 and 26 based on the voltage transition in the second voltage section Vs2 like the fourth secondary battery 24.

In the present embodiment 1, the capacity estimation unit 62 shown in FIG. 1 estimates the total capacity of the secondary batteries 21 to 26 based on the battery characteristic acquired by the battery characteristic acquisition unit 61. For the estimation of the total capacity, a prediction model such as a regression equation can be used, and for example, linear regression, Lasso regression, Ridge regression, decision tree, and support vector regression can be used.

The determination unit 63 shown in FIG. 1 determines the deterioration degree of the secondary batteries 21 to 26 based on the battery characteristic or the battery characteristic relationship value. The battery characteristic relationship value is a value calculated based on the battery characteristic, and in the present embodiment 1, the estimation result of the total capacity of the secondary batteries 21 to 26 by the capacity estimation unit 62 is adopted as the battery characteristic relationship value. Therefore, in the present embodiment 1, the determination unit 63 determines the deterioration degree of the secondary batteries 21 to 26 based on the estimation result of the capacity estimation unit 62. The determination method can be performed by comparing the estimation result of the capacity estimation unit 62 with the reference value stored in advance in the reference value memory unit 52.

When the voltage falls below the usage limit lower limit Vmin from the discharging start time T0 to the discharging end time Te as in the first secondary battery 21 in a modified embodiment 1 shown in FIG. 5, the first secondary battery 21 cannot be reused, and thus individual parts can be recycled by performing disassembling and the like without determining the deterioration degree without acquiring the battery characteristic.

In the deterioration degree determination device 1, for example, as shown in FIG. 3, the detection unit 3 and the storage unit 4 are configured with an apparatus and a device previously installed in the vehicle on which the battery pack 2 is mounted, and the memory unit 5, the calculation unit 6, and the control unit 7 can be configured with a scan tool 110 possessed by a service station and the like that inspects or repairs the vehicle 100.

A method for determining the deterioration degree by the deterioration degree determination device 1 of the present embodiment will be described below.

Figure 6:
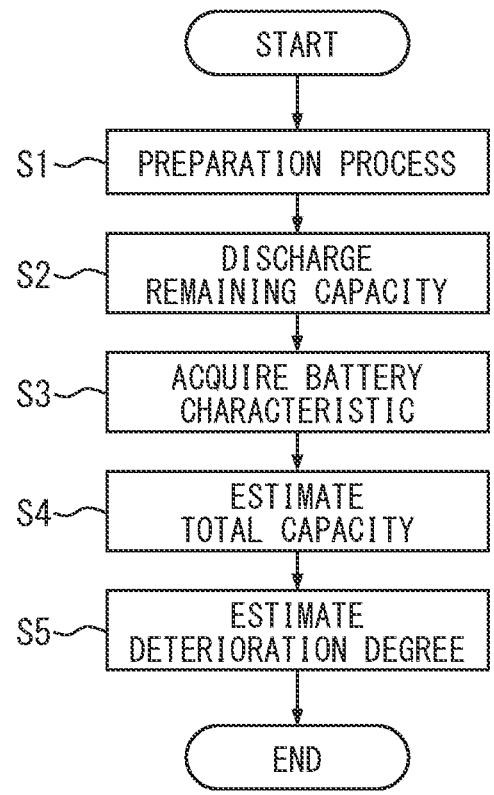
FIG. 6 is a flowchart showing a method for determining a deterioration degree of a secondary battery in the embodiment 1.

First, in the present embodiment, in a step S1 shown in FIG. 6, as a preparation process, a vehicle mounted with the battery pack 2 is brought to the service station, and is connected to the scan tool 110 forming the memory unit 5, the calculation unit 6, and the control unit 7 of the deterioration degree determination device 1 of the vehicle.

Next, in a step S2 shown in FIG. 6, discharging is performed until the open circuit voltage of at least one of the secondary batteries 21 to 26 reaches the discharging target voltage VP. Accordingly, the remaining capacity of each of the secondary batteries 21 to 26 is discharged. In the present embodiment, as shown in FIG. 4, the discharging is continued until the first secondary battery 21 reaches the discharging target voltage. In the present embodiment, the secondary batteries 21 to 26 are nickel-metal hydride batteries, and thus a memory effect may occur in the corresponding secondary batteries 21 to 26, but the cancellation of the memory effect is also performed at the same time for one, which is discharged down to the discharging target voltage VP or to a voltage close to the discharging target voltage VP, among the secondary batteries 21 to 26.

Along with discharging of the remaining capacity in the step S2, in a step S3 shown in FIG. 6, the battery characteristic of each of the secondary batteries 21 to 26 is acquired by the battery characteristic acquisition unit 61. In the present embodiment, the above-mentioned discharging voltage characteristic is acquired as the battery characteristic.

In the present embodiment, as shown in FIG. 4, with respect to the secondary batteries 21 to 26, the battery characteristic acquisition unit 61 acquires the voltage temporal change that indicates the relationship of the voltage change individually acquired with respect to the passage of time from the discharging start time T0 to a discharging end time Te as the voltage transition. The battery characteristic acquisition unit 61 acquires the discharging voltage characteristic based on the voltage transition in the first voltage section with respect to the secondary batteries 21 to 23, among the secondary batteries 21 to 26 forming the battery pack 2, for which the voltage transition has been able to be acquired in the entire range of the first voltage section Vs1. On the other hand, with respect to the secondary batteries 24 to 26 for which the voltage transition has not been able to be acquired in the entire range of the first voltage section Vs1, the battery characteristic acquisition unit 61 acquires the discharging voltage characteristic based on the voltage transition in the second voltage section Vs2 included in a range in which the voltage transition has been able to be acquired.

In each of the secondary batteries 21 to 23, the differential value at a predetermined voltage in the first voltage section Vs1, that is, the slope of the tangent line at the predetermined voltage in the first voltage section Vs1 in the graph of the voltage temporal change shown in FIG. 4 is calculated, and is used as the discharging voltage characteristic of each of the secondary batteries 21 to 23. As shown in FIG. 4, in each of the secondary batteries 24 to 26, the differential value at a predetermined voltage in the second voltage section Vs2, that is, the slope of the tangent line at the predetermined voltage in the second voltage section Vs2 in the graph of the voltage temporal change shown in FIG. 4 is calculated, and is used as the discharging voltage characteristic of each of the secondary batteries 24 to 26.

In the present embodiment, as the discharging voltage characteristic, the voltage temporal change is acquired as the voltage transition to use the differential value in a predetermined voltage within the predetermined voltage sections Vs1 and Vs2, but instead of the above-mentioned, the ratio of the voltage change between the two points in the voltage temporal change derived as the voltage transition, that is, the slope of the straight line passing through the corresponding two points in the graph of the voltage temporal change may be calculated and used as the discharging voltage characteristic. For example, as two points in the voltage temporal change of the secondary batteries 21 to 23 shown in FIG. 4, two points of the start time and the end time of the voltage section Vs1 can be adopted, and as two points in the voltage temporal change of the secondary batteries 24 to 26, two points of the start time and the end time of the voltage section Vs2 can be adopted.

In the present embodiment, as the discharging voltage characteristic, the voltage temporal change is acquired as the voltage transition to use the differential value in a predetermined voltage within the predetermined voltage section Vs, but instead of the above-mentioned, the voltage-capacity change indicating the relationship of the voltage change with respect to the capacity from a capacity QO at the discharging start time to a capacity QP1 at the discharging end time as the voltage transition, may be acquired. The differential value at a predetermined voltage in the voltage sections Vs1 and Vs2, that is, the slope of the tangent line at the predetermined voltage in the graph of the voltage-capacity change may be calculated, and may be used as the discharging voltage characteristic of each of the secondary batteries 21 to 26.

Then, in a step S4 as shown in FIG. 6, the capacity estimation unit 62 estimates the total capacity of the secondary batteries 21 to 26, that is, the full charging capacity or the full discharging capacity, based on the battery characteristic acquired by the battery characteristic acquisition unit 61. In the present embodiment, the capacity estimation unit 62 estimates the total capacity of the secondary batteries 21 to 26 from the discharging voltage characteristic acquired by the battery characteristic acquisition unit 61 as the battery characteristic, based on the correspondence relationship between the total capacity and the discharging voltage characteristic based on the prediction model stored in the correspondence relationship memory unit 51.

In a step S5 shown in FIG. 6, the determination unit 63 determines the deterioration degree of the secondary batteries 21 to 26 based on the total capacity estimated by the capacity estimation unit 62.

In the battery pack 2 in a state of being mounted on the vehicle, the secondary batteries 21 to 26 are appropriately recombined or replaced according to the deterioration degree determined individually, and newly assembled into the battery pack, such that a rebuilt product can be manufactured. In the present embodiment, the rebuilt product can be manufactured as follows.

Figure 7:
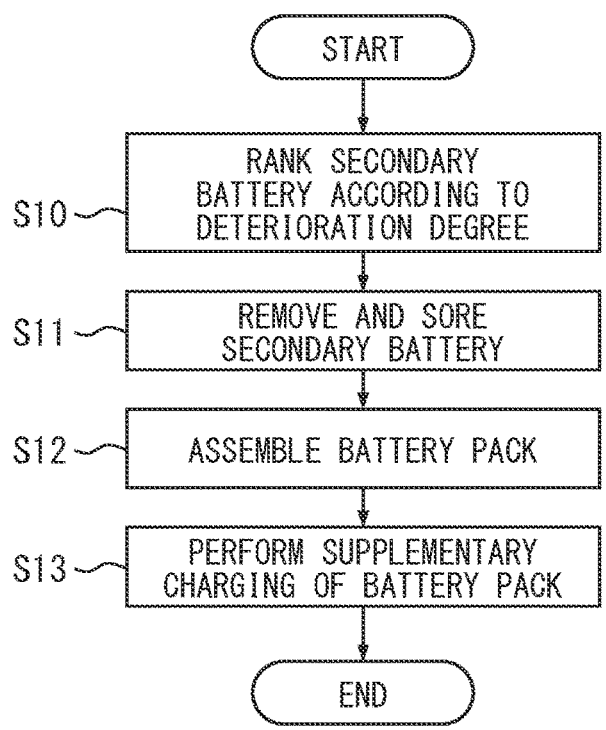
FIG. 7 is a flowchart showing a method for manufacturing the battery pack in the embodiment 1.

First, in a step S10 shown in FIG. 7, the secondary batteries are ranked according to the deterioration degree acquired as described above. In the present embodiment, the absolute value of the deterioration degree is divided into a predetermined range of five stages, and the ranks are A, B, C, D, and E in order from the one with the smallest absolute value of the deterioration degree. Accordingly, the secondary batteries included in the same rank have the same deterioration degree. The ranking criteria can be set as appropriate.

In a step S11 shown in FIG. 7, the secondary battery is taken out from the battery pack and sorted by rank. Similarly sorted secondary batteries are collected from other battery packs. In a step S12, the secondary batteries are assembled such that the ranks of the secondary batteries are in a desired combination, and the battery pack as a rebuilt product is manufactured. The combination of ranks of the secondary batteries can be set as appropriate. For example, by assembling the battery pack 2 by combining the secondary batteries of the same rank, the difference in the deterioration degrees of the secondary batteries included in the corresponding battery pack 2 can be set to a predetermined reference value or less. The present disclosure is not limited thereto, and the battery pack 2 may be created within a predetermined range of ranks, for example, the battery pack may be created from the secondary batteries included in the A rank and the B rank. The secondary battery ranked at the lowest rank E may be discarded as unusable, or may be disassembled and used for recycling of members. Thereafter, in the present embodiment, in a step S13 shown in FIG. 7, supplementary charging of the battery pack is performed. Accordingly, the secondary battery can be used as a battery pack.

Next, the operation effect of the deterioration degree determination device 1 of the present embodiment will be described in detail.

In the deterioration degree determination device 1, the charging and discharging operation is performed in a state where the multiple secondary batteries 21 to 26 are connected to each other to form the battery pack 2, and for at least some of the secondary batteries 21 to 26, the battery characteristic related to transition in a battery state over the predetermined voltage sections Vs1 and Vs2 is acquired. The deterioration degree of at least some of the secondary batteries 21 to 26 is determined based on the battery characteristic or the battery characteristic relationship value calculated based on the battery characteristic. When the deterioration degree is determined, the multiple secondary batteries 21 to 26 forming the battery pack 2 are already connected to each other, and thus there is no need to take out the secondary batteries 21 to 26 from the battery pack 2 and wire the secondary battery to the deterioration degree determination device for individual charging and discharging. Therefore, it is possible to reduce the workload for determining the deterioration degree of the secondary batteries 21 to 26.

In the present embodiment, the multiple secondary batteries 21 to 26 forming the battery pack 2 includes a secondary battery that is set with a predetermined voltage section for acquiring the battery characteristic different from a voltage section of another secondary batteries of the multiple secondary batteries 21 to 26. That is, the first voltage section Vs1 is set as the predetermined voltage section for a portion of the multiple secondary batteries 21 to 26, and the second voltage section Vs2 is set as the predetermined voltage section for the other portions. Accordingly, for the secondary batteries 24 to 26 for which the voltage transition in the first voltage section Vs1 has not be able to be acquired, when the voltage transition in the second voltage section Vs2 different from the first voltage section Vs1 can be acquired, the deterioration degree can be determined based on the above-mentioned, and thus it becomes easy to determine the deterioration degree of the individual secondary batteries 21 to 26 without removing the secondary batteries 21 to 26 from the battery pack.

In the present embodiment, the multiple secondary batteries 21 to 26 forming the battery pack 2 include the secondary battery set with voltage sections Vs1 and Vs2 common to each other as the predetermined voltage section for acquiring the battery characteristic. That is, among the multiple secondary batteries 21 to 26, the secondary batteries 21 to 23 have the first voltage section Vs1 set as the common voltage section, and the secondary batteries 24 to 26 have the second voltage section Vs2 set as the common voltage section. Accordingly, the management of the voltage section can be easier, the load of calculating the battery characteristic can be reduced.

In the present embodiment, the charging and discharging control unit 71 is configured to allow the voltage of the secondary batteries 21 to 26 to deviate from the preset normal use range when the charging and discharging operation of the battery pack 2 is performed. Accordingly, a wide voltage section for acquiring the battery characteristic can be secured, and thus the determination accuracy of the deterioration degree can be improved.

In the present embodiment, the charging and discharging control unit 71 is configured to allow the voltage of the secondary batteries 21 to 26 to deviate from the preset usable range when the charging and discharging operation of the battery pack 2 is performed. Accordingly, in a case where the secondary batteries 21 to 26 forming the battery pack 2 include a secondary battery of which the deterioration has progressed more than others, when the charging and discharging operation is performed in the state of the battery pack 2, there is a case where the voltage transition over the entire predetermined voltage section in the other secondary batteries cannot be acquired during the charging and discharging period within the usable range of the secondary battery for which the corresponding deterioration has progressed. Therefore, by allowing some secondary batteries to deviate from the usable range, it is possible to acquire the voltage transition of the entire predetermined voltage section in other secondary batteries, and the determination accuracy of the deterioration degree of the other secondary batteries can be improved. The secondary battery charged and discharged outside the usable range cannot be used as a secondary battery, and thus the secondary battery can be disassembled and the parts and the like can be recycled.

In the present embodiment, the battery pack 2 is for a vehicle, and the charging and discharging control unit 71 is configured to charge and discharge the battery pack 2 in a state of being mounted on the vehicle. Accordingly, it is not necessary to remove the battery pack 2 from the vehicle when the deterioration degree of the secondary batteries 21 to 26 is determined, and thus workability can be improved.

Instead of the charging and discharging operation of the battery pack 2 in a state of being mounted on the vehicle, the battery pack 2 may be removed from the vehicle and the charging and discharging operation may be performed by the charging and discharging control unit 71 in the state of the battery pack 2. In this case, the battery pack 2 may be wired to the deterioration degree determination device 1, and thus the labor of wiring work can be reduced as compared with a case where the secondary batteries 21 to 26 are taken out from the battery pack 2 and individually wired to the deterioration degree determination device 1, such that the workability can be improved.

In the present embodiment, the charging and discharging control unit 71 is configured to charge and discharge the secondary battery via the apparatus mounted on the vehicle. Accordingly, it is not necessary to separately prepare a charging device or a discharging device for charging and discharging the secondary batteries 21 to 26, and thus the configuration of the deterioration degree determination device 1 can be simplified and the manufacturing cost can be reduced.

In the present embodiment, the capacity estimation unit 62 estimates the total capacity of the secondary batteries 21 to 26 from the battery characteristic acquired by the battery characteristic acquisition unit 61, and the determination unit 63 determines the deterioration degree of the secondary batteries 21 to 26 based on the corresponding estimation result, but instead of the above-mentioned, the capacity estimation unit 62 may not estimate the total capacity and the determination unit 63 may determine the deterioration degree of the secondary batteries 21 to 26 based on the battery characteristic acquired by the battery characteristic acquisition unit 61. The battery characteristic acquisition unit 61 may acquire the absolute value of the acquired value as the battery characteristic, and the determination unit 63 may determine the deterioration degree based on the corresponding absolute value. The determination unit 63 may determine the deterioration degree of the secondary batteries 21 to 26 based on the difference in the battery characteristic acquired by the battery characteristic acquisition unit 61.

In the present embodiment, the battery pack 2 is assembled by classifying the secondary batteries 21 to 26 into classes such that the deterioration degree of the secondary batteries 21 to 26 is within a predetermined range, but the battery pack 2 may be assembled by classifying the secondary batteries 21 to 26 into classes such that the difference of the deterioration degree of the secondary batteries 21 to 26 is within a predetermined range.

In the present embodiment, the battery characteristic is the discharging voltage characteristic based on the voltage transition in the predetermined voltage sections Vs1 and Vs2 in the secondary batteries 21 to 26. When the secondary batteries 21 to 26 are nickel-metal hydride batteries, at the time of reusing the used secondary batteries 21 to 26, the used secondary batteries 21 to 26 may be discharged for the purpose of canceling the memory effect, and by acquiring the discharging voltage characteristic during the discharging, the work process for reusing the secondary batteries 21 to 26 can be simplified.

Figure 8:
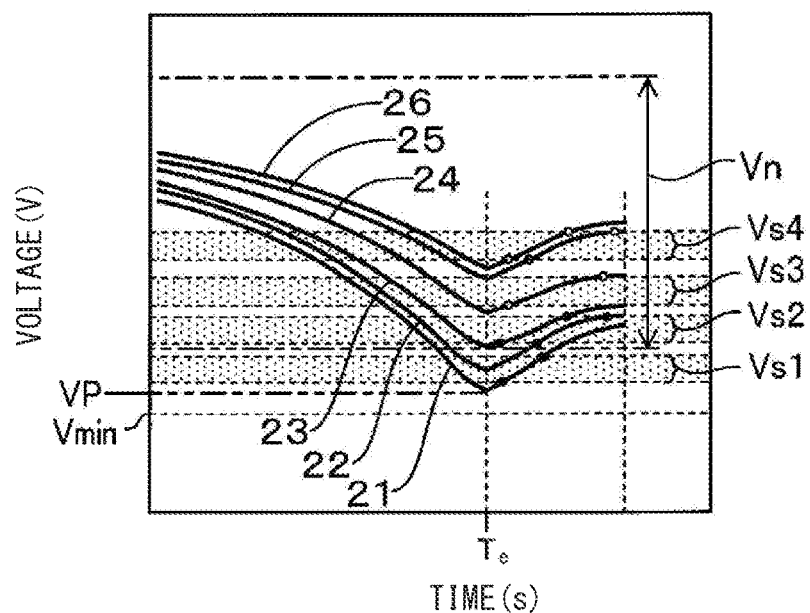
FIG. 8 is a conceptual diagram showing a battery characteristic in a modified embodiment 1.

In the present embodiment, the discharging voltage characteristic is calculated based on the voltage transition during the discharging of the secondary batteries 21 to 26, but instead of or together with the above-mentioned, the discharging voltage characteristic may be calculated based on the voltage transition during the voltage relaxation in which the voltage of the secondary batteries 21 to 26 returns to the open circuit voltage after the discharging is stopped. In the modified embodiment 1 shown in FIG. 8, each of the secondary batteries 21 to 26 has the voltage relaxation after the discharging end time Te. In the first secondary battery 21, based on the voltage transition in the first voltage section Vs1 included in the voltage range in which the voltage relaxation occurs, as in the case of the embodiment 1, the discharging voltage characteristic can be acquired by calculating the differential value of the corresponding voltage section. Similarly, in the second secondary battery 22 and the third secondary battery 23, the discharging voltage characteristic can be acquired based on the voltage transition in the second voltage section Vs2, in the fourth secondary battery 24, the discharging voltage characteristic can be acquired based on the voltage transition in the third voltage section Vs3, and in the fifth secondary battery 25 and the sixth secondary battery 26, the discharging voltage characteristic can be acquired based on the voltage transition in the fourth voltage section Vs4. Also in this case, the same operation effect as the operation effect of the present embodiment is obtained.

According to the deterioration degree determination device 1 of the present embodiment, the battery pack includes the multiple secondary batteries having the usage history, and the battery pack can be provided in which the total capacity is estimated by using the discharging voltage characteristic of the multiple secondary batteries and the difference in the deterioration degree of each of the multiple secondary batteries, which is determined based on the corresponding total capacity, is within a predetermined range. In such a battery pack, the variation in the deterioration degree of the secondary battery included in the battery pack becomes smaller, and thus the lifetime of the battery pack as a rebuilt product can be extended and the quality improvement can be attempted.

Figure 9:
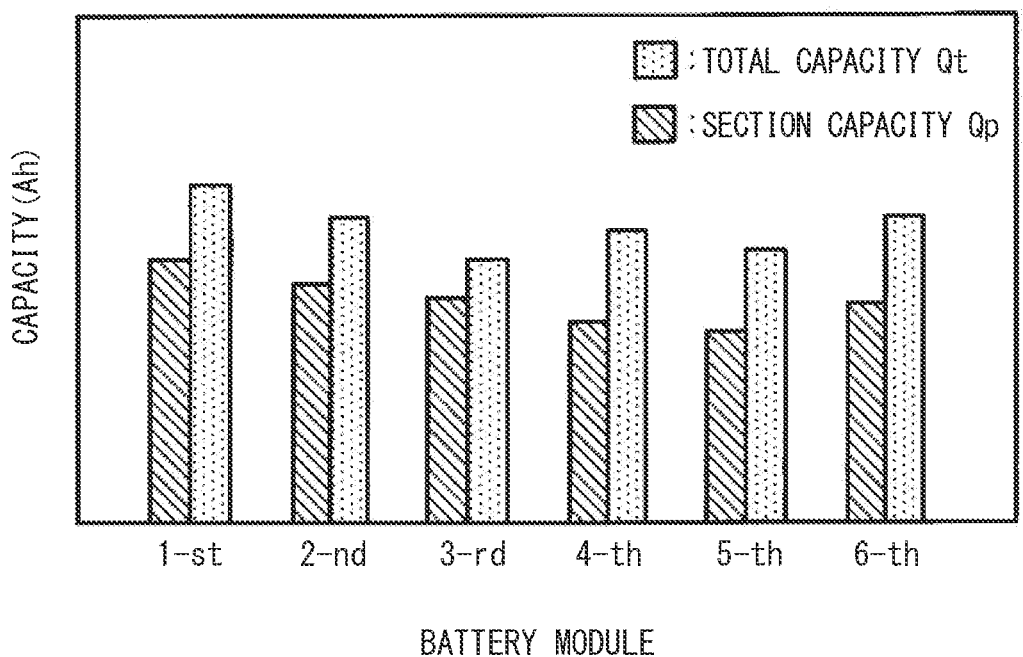
FIG. 9 is a conceptual diagram showing a battery characteristic in a modified embodiment 2.

The battery characteristic acquisition unit 61 may replace calculating the ratio of the voltage change of the secondary batteries 21 to 26 to the elapsed time in the predetermined voltage section Vs as the voltage transition, or in addition to the above-mentioned, may calculate the capacity change amount of each of the secondary batteries 21 to 26 in the predetermined voltage section as a section capacity Qp and use the section capacity Qp as the discharging voltage characteristic. For example, in the present embodiment shown in FIG. 4, the section capacity Qp of the secondary batteries 21 to 23 can be calculated from the current value flowing through the secondary batteries 21 to 23 in the voltage section Vs1 detected by the current value detection unit 32 and the time during which the current flows. Similarly, the section capacity Qp of the secondary batteries 24 to 26 can be calculated from the current value flowing through the secondary batteries 24 to 25 in the voltage section Vs1 detected by the current value detection unit 32 and the time during which the current flows. Each section capacity Qp can be expressed as shown in FIG. 9. Also in this case, the deterioration degree of the secondary batteries 21 to 26 can be easily and accurately determined based on the corresponding section capacity Qp as the discharging voltage characteristic.

As shown in FIG. 4, a total charging and discharging capacity Qt shown in FIG. 9 may be calculated as the capacity of all sections of discharging time T0 to Te in each of the secondary batteries 21 to 26, and the capacity ratio, that is, the ratio of the section capacity Qp to the total charging and discharging capacity Qt, may be calculated and be used as the discharging voltage characteristic. Instead of the total charging and discharging capacity Qt, a specific section capacity Qt' that is the capacity of the specific voltage section including the voltage section for calculating the battery characteristic may be calculated, and the capacity ratio that is a ratio of the section capacity Qp to the specific section capacity Qt' may be calculated and used as the discharging voltage characteristic. Also in this case, the deterioration degree of the secondary batteries 21 to 26 can be determined with high accuracy and easily based on the discharging voltage characteristic.

As the voltage transition, the ratio of the voltage change of the secondary batteries 21 to 26 to the capacity change in the predetermined voltage sections Vs1 and Vs2, that is, the differential value of the voltage in the voltage sections Vs1 and Vs2 in the voltage capacity change may be calculated, and may be used as the discharging voltage characteristic. Also in this case, the same operation effect as the operation effect of the present embodiment is obtained.

Figure 10:
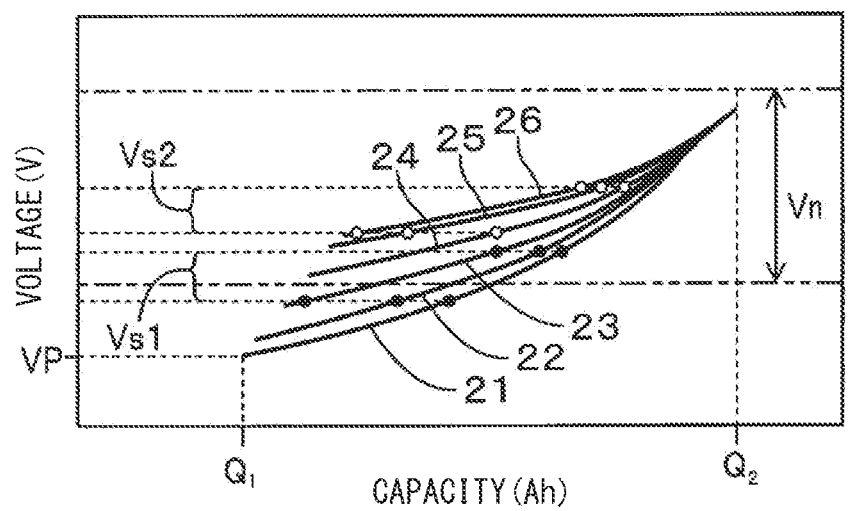
FIG. 10 is a conceptual diagram showing a battery characteristic in a modified embodiment 3.

As in the modified embodiment 3 shown in FIG. 10, as the voltage transition, the ratio of the voltage change of the secondary batteries 21 to 26 to the capacity change in the predetermined voltage section, that is, the differential value of the voltage in the voltage section in the voltage capacity change may be calculated, and may be used as the discharging voltage characteristic. In the modified embodiment 3, as the voltage section, the first voltage section Vs1 is set in the secondary batteries 21 to 23, and the second voltage section Vs2 is set in the secondary batteries 24 to 26. Also in this case, the same operation effect as the operation effect of the present embodiment is obtained.

According to the deterioration degree determination device 1 of the present embodiment, the battery pack includes the multiple secondary batteries having the usage history, and the battery pack can be provided in which the total capacity is estimated by using the battery characteristic based on the voltage transition calculated based on at least one of the capacity change amount of the secondary battery in the predetermined voltage sections Vs1 and Vs2, the ratio of the voltage change of the secondary battery to the capacity change of the secondary battery in the voltage sections Vs1 and Vs2, and the ratio of the voltage change of the secondary batteries 21 to 26 to the elapsed time in the voltage sections Vs1 and Vs2, and the difference in the deterioration degree of each of the multiple secondary batteries, which is determined based on the corresponding total capacity, is within a predetermined range. In such a battery pack, the variation in the deterioration degree of the secondary battery included in the battery pack becomes smaller, and thus the quality improvement of the battery pack as a rebuilt product can be attempted.

In the present embodiment, the battery characteristic acquisition unit 61 provided in the deterioration degree determination device 1 calculates the battery characteristic to acquire the battery characteristic, but instead of the above-mentioned, the deterioration degree determination device 1 may have an external input unit and calculate the battery characteristic by using an externally provided arithmetic device, such that by inputting the corresponding battery characteristic to the battery characteristic acquisition unit 61 via the external input unit, the battery characteristic acquisition unit 61 may acquire the battery characteristic.

Figure 11:
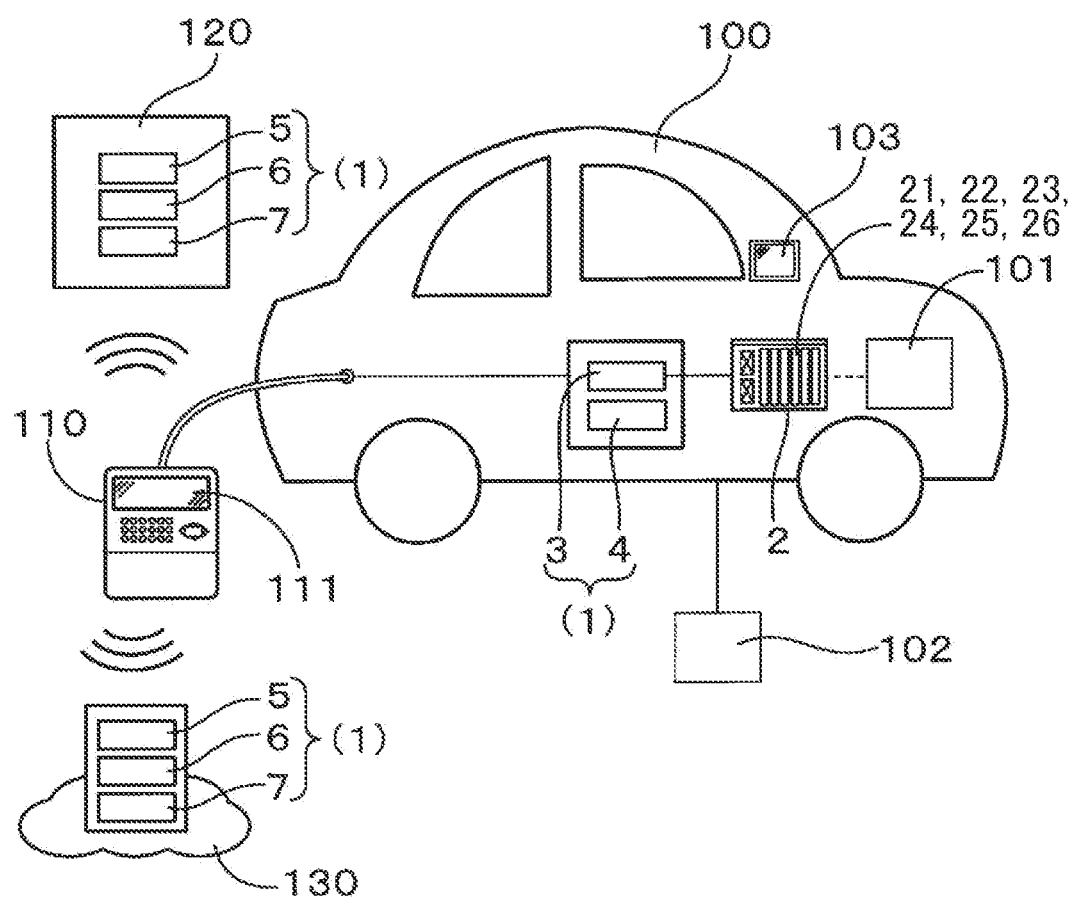
FIG. 11 is a conceptual diagram showing another usage state of the deterioration degree determination device in the embodiment 1.

The memory unit 5, the calculation unit 6, and the control unit 7 of the deterioration degree determination device 1 of the present embodiment are provided in the scan tool 110 possessed by the vehicle-purpose service station, but instead of the above-mentioned, as shown in FIG. 11, a configuration may be provided such that at least one of the memory unit 5, the calculation unit 6, and the control unit 7 in the deterioration degree determination devices 1 is provided in an external server 120 and the like and the scan tool 110 having a communication function as a client terminal provided in the service station and the like connects to an external server and the like via a network, or a configuration may be provided by using a cloud service 130 via the Internet. The deterioration degree determination device 1 may be configured such that the memory unit 5, the calculation unit 6, and the control unit 7 of the deterioration degree determination device 1 are provided in the external server and the vehicle is provided with a communication function to use the cloud service 130 to enable communication with the external server. When the deterioration degree determination is performed using the cloud service 130, the scan tool 110 or the vehicle 100 is provided with display units 111 and 103 to be able to display a diagnosis result and the measures to be taken according to the diagnosis result and the like.

Figure 12:
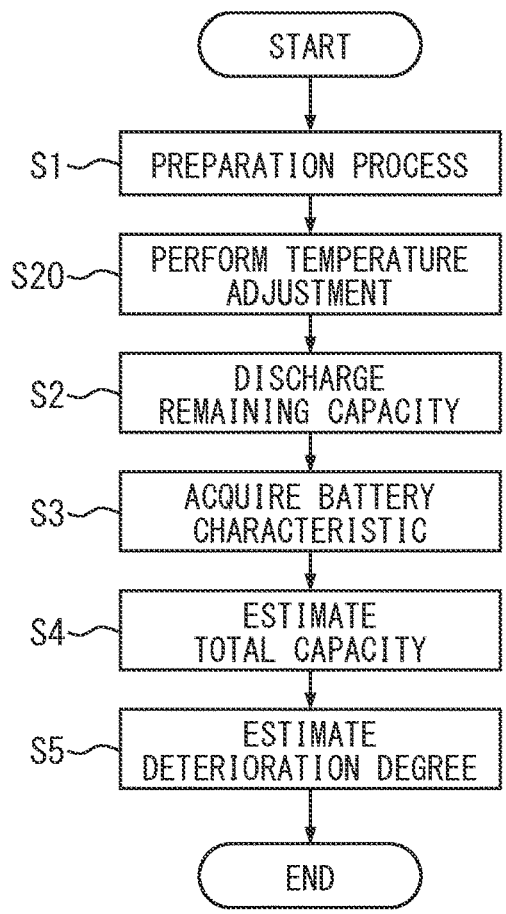
FIG. 12 is a flowchart showing a method for determining a deterioration degree of a secondary battery in a modified embodiment 4.

In the determination of the deterioration degree by the deterioration degree determination device 1 of the present embodiment, after the above-mentioned preparation process S1 as in a modified embodiment 4 shown in FIG. 12, in a step S20, temperature adjustment may be performed to control the temperature of the secondary batteries 21 to 26 to a predetermined temperature. The temperature adjustment can allow the vehicle mounted with the battery pack 2 to control the temperature of the storage room, or control the temperature of the vehicle including the battery pack 2 by using the air conditioner for a vehicle cabin mounted on the vehicle. By adjusting the above temperature by the temperature adjustment and soaking the secondary batteries 21 to 26, the temperature of the secondary batteries 21 and 2 can be set to a preset set temperature. Multiple temperatures may be set as the set temperature.

In the modified embodiment 4, the temperature of the battery pack 2 can be detected by a temperature sensor (not shown) provided on the battery pack 2. When a temperature sensor is provided for each of the secondary batteries 21 to 26, the temperature detected by each temperature sensor may be set as the temperature of the secondary batteries 21 to 26, but when the temperature sensor is not provided for each of the secondary batteries 21 to 26, the temperature of each secondary batteries 21 to 26 may be estimated from the temperature detected by the temperature sensor in consideration of the configuration of the battery pack 2 and the disposition of the secondary batteries 21 to 26. The corresponding temperature estimation can be performed by using an estimation formula that logically derives the temperature of the secondary battery, a map of the detected temperature and the secondary battery temperature created based on the model of the battery pack, and the like. After the step S20 shown in FIG. 12, the same procedure as in S2 to S5 of FIG. 6 is performed. According to the determination method, the deterioration degree determination can be performed by setting the temperature of the secondary batteries 21 to 26 to a preset set temperature, and thus the determination accuracy can be improved.

In the present embodiment, as shown in FIG. 4, the initial voltage, which is the voltage at the discharging start time T0, varies in the secondary batteries 21 to 26, but when the secondary batteries 21 to 26 are lithium ion batteries, before determining the deterioration degree, equalization may be performed to equalize the initial voltages in the secondary batteries 21 to 26. The equalization can be performed by performing the charging and discharging operation of the battery pack 2 in a state where any of the secondary batteries 21 to 26 is bypassed. By performing the equalization, it becomes easy to detect the voltage transition of the secondary batteries 21 to 26 in a common voltage section, and thus the determination accuracy can be improved.

As described above, according to the present aspect, the deterioration degree determination device 1 for a secondary battery capable of improving workability when the deterioration degree of the secondary batteries 21 to 26 forming the battery pack 2 is determined, can be provided.

Embodiment 2

Figure 13:
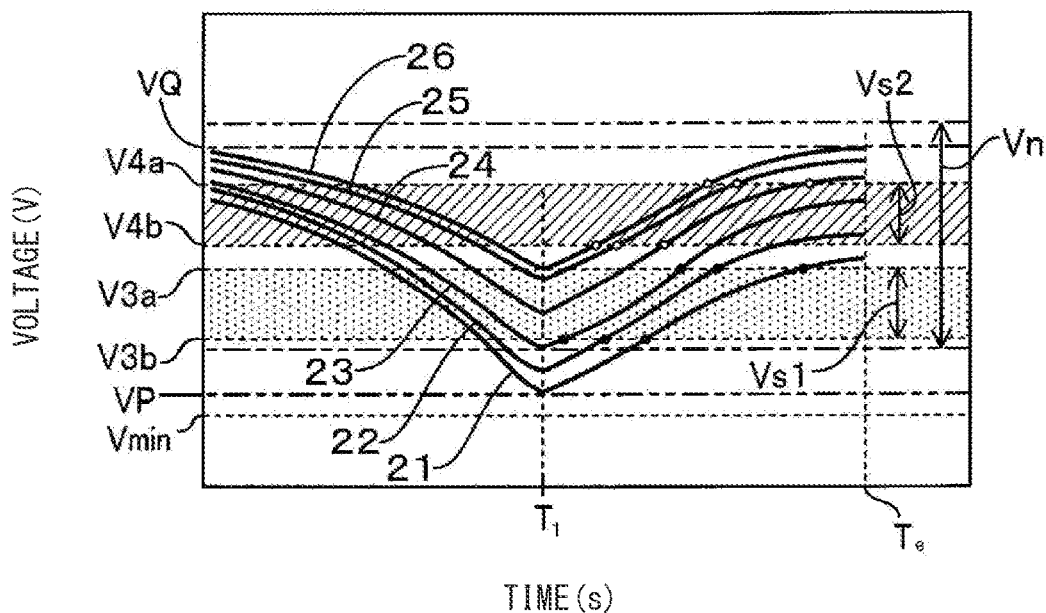
FIG. 13 is a conceptual diagram showing a battery characteristic in an embodiment 2.

In the embodiment 1 described above, the discharging voltage characteristic is adopted as the battery characteristic, but in the embodiment 2, as shown in FIG. 13, charging is performed from the charging start time T1 to the charging end time Te after discharging is ended. As the battery characteristic, along with the discharging voltage characteristic of the embodiment 1, the charging voltage characteristic is acquired based on the voltage transition when one of the secondary batteries 21 to 26 is charged to the predetermined charging target voltage VQ. The charging target voltage VQ is not particularly limited, but in the present embodiment, is set to a value within the normal use range Vn.

As shown in FIG. 13, among the multiple secondary batteries 21 to 26, for the secondary batteries 21 to 23, the first voltage section Vs1 is set as a predetermined voltage section for acquiring the voltage transition, and based on the above-mentioned, the battery characteristic acquisition unit 61 acquires the first charging voltage characteristic as the battery characteristic. On the other hand, for the other secondary batteries 24 to 26, the voltage transition of a portion of the first voltage section Vs1 has not been acquired, and thus instead of the above-mentioned, the second voltage section Vs2 is selected as a section in which the battery characteristic can be acquired from the voltage section acquired from the charging start time T1 to the charging end time Te, and based on the above-mentioned, the battery characteristic acquisition unit 61 acquires the second charging voltage characteristic as the battery characteristic. The charging voltage characteristic as the battery characteristic in the present embodiment can be calculated in the same manner as the discharging voltage characteristic in the embodiment 1 and each modified embodiment. The other configuration elements are the same as in the case of the embodiment 1, and the same reference numerals as those in the embodiment 1 will be used in the present embodiment as well, and the description thereof will be omitted.

The charging voltage characteristic may be the ratio of the voltage change between two points of the start time and the end time of the predetermined voltage sections Vs1 and Vs2 as in the case of calculating the discharging voltage characteristic in the above-described embodiment 1, may be the section capacity in the voltage sections Vs1 and Vs2, or may be the capacity ratio of the section capacity to the total charging and discharging capacity that is the capacity of all sections at the charging time. Instead of the total charging and discharging capacity, a specific section capacity that is the capacity of the specific voltage section including the voltage section for calculating the battery characteristic may be calculated, and the capacity ratio of the section capacity to the specific section capacity may be calculated and used as the charging voltage characteristic.

In the present embodiment 2, the battery characteristic acquisition unit 61 acquires both the discharging voltage characteristic and the charging voltage characteristic, and the capacity estimation unit 62 estimates the total capacity of the secondary batteries 21 to 26 based on the discharging voltage characteristic and the charging voltage characteristic. Accordingly, the deterioration degree of the secondary batteries 21 to 26 can be determined with higher accuracy.

When the battery pack of a rebuilt product is manufactured by using the deterioration degree determination device 1 of the present embodiment 2, each of the secondary batteries is charged before the battery pack 2 is assembled, and thus supplementary charging of the battery pack in the step S13 in FIG. 7 becomes unnecessary.

In the present embodiment 2, the battery characteristic acquisition unit 61 acquires the charging voltage characteristic after acquiring the discharging voltage characteristic by discharging and then charging the secondary batteries 21 to 26 but is not limited thereto, and may acquire the discharging voltage characteristic after acquiring the charging voltage characteristic by charging and then discharging the secondary batteries 21 to 26.

In the present embodiment 2, the battery characteristic acquisition unit 61 acquires both the discharging voltage characteristic and the charging voltage characteristic, but instead of the above-mentioned, may acquire only the charging voltage characteristic. In this case, the determination accuracy may be inferior to the determination accuracy in the case of acquiring both the discharging voltage characteristic and the charging voltage characteristic. On the other hand, when the secondary batteries 21 to 26 are nickel-metal hydride batteries, a memory effect may occur, and when only the discharging voltage characteristic is acquired, in the discharging voltage characteristic, variation may occur in the voltage transition due to the influence of the memory effect, such that there is a concern that the improvement of the determination accuracy is restricted. However, when only the charging voltage characteristic is acquired after the remaining capacity is discharged, with respect to one among the secondary batteries 21 to 26, which is discharged to the discharging target voltage VP or a voltage close to the discharging target voltage VP, the charging voltage characteristic is acquired after the cancellation of the memory effect is attempted, and thus the influence of the memory effect is small, such that the determination accuracy can be expected to be improved.

The charging voltage characteristic in the present embodiment 2, as in the case of the discharging voltage characteristic of the embodiment 1, may be calculated based on the voltage transition during the voltage relaxation in which the open circuit voltage is returned after charging is stopped. Also in this case, the same operation effect as the operation effect of the present embodiment is obtained.

Also in the present embodiment 2, as in the modified embodiment in the embodiment 1, the determination unit 63 may determine the deterioration degree of the secondary batteries 21 to 26 based on the battery characteristic acquired by the battery characteristic acquisition unit 61 without estimating the total capacity by the capacity estimation unit 62. The battery characteristic acquisition unit 61 may acquire the absolute value of the acquired value as the battery characteristic, and the determination unit 63 may determine the deterioration degree based on the corresponding absolute value. The determination unit 63 may determine the deterioration degree of the secondary batteries 21 to 26 based on the difference in the battery characteristic acquired by the battery characteristic acquisition unit 61. The battery pack 2 may be assembled by classifying the secondary batteries 21 to 26 into classes such that the difference between the deterioration degrees of the secondary batteries 21 to 26 is within a predetermined range.

Embodiment 3

Figure 14:
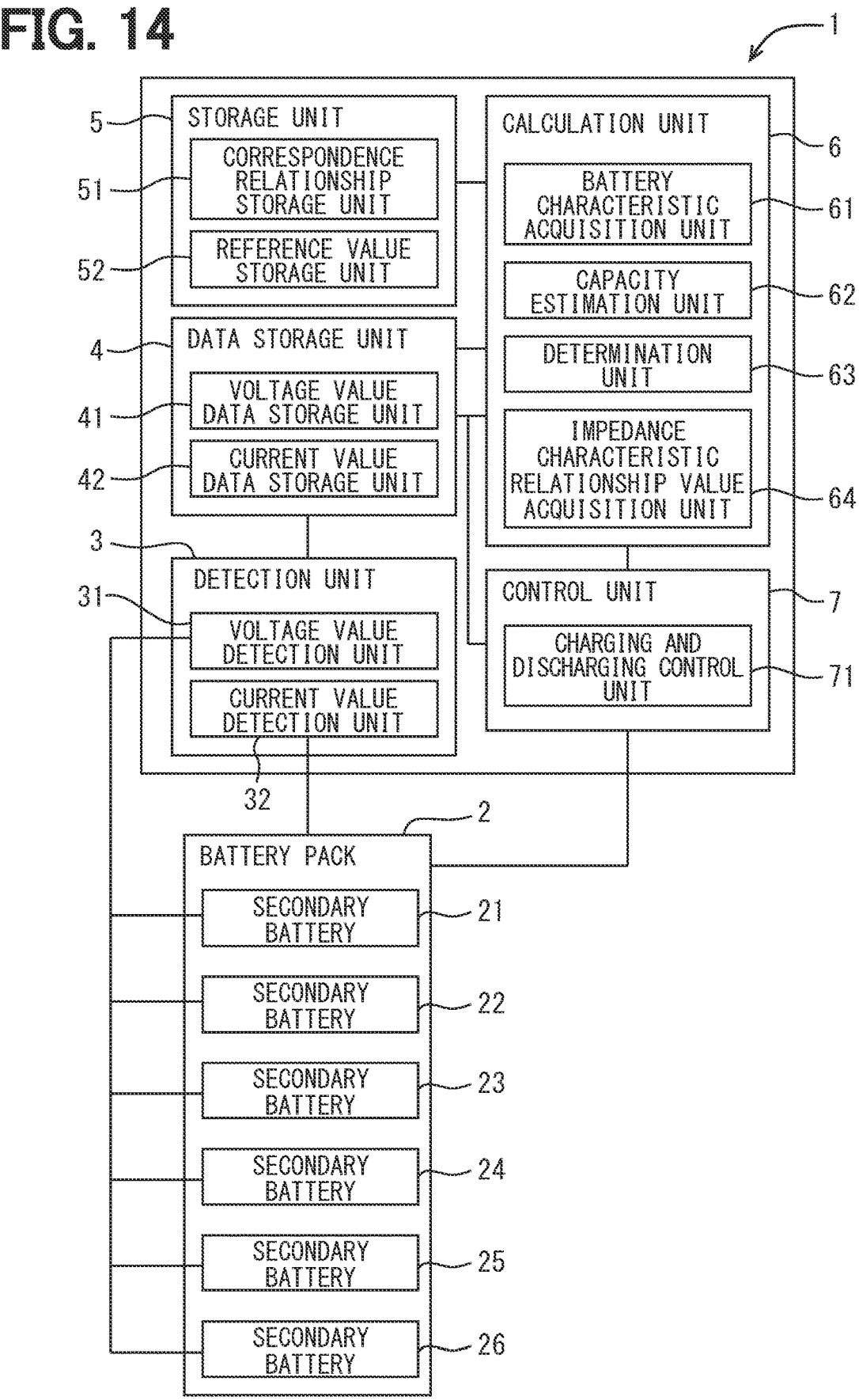
FIG. 14 is a conceptual diagram showing a configuration of a deterioration degree determination device in an embodiment 3.

In the deterioration degree determination device 1 of the present embodiment 3, in addition to the configuration of the embodiment 1, the calculation unit 6 includes an impedance characteristic relationship value acquisition unit 64 as shown in FIG. 14. The impedance characteristic relationship value acquisition unit 64 acquires the impedance characteristic relationship value of the secondary batteries 21 to 26 by DC-IR measurement and low frequency AC-IR measurement based on the detection value of the voltage value detection unit 31 and the current value detection unit 32. Other configurations are the same as those of the embodiment 1, and the same reference numerals are given to the same configurations of the embodiment 1, and the description thereof will be omitted.

In the present embodiment 3, the battery characteristic acquisition unit 61 acquires the discharging voltage characteristic in the predetermined voltage sections Vs1 and Vs2 shown in FIG. 4, as in the case of the embodiment 1. The impedance characteristic relationship value acquisition unit 64 acquires the impedance characteristic relationship value of the secondary batteries 21 to 26 at the discharging end time Te.

The correspondence relationship memory unit 51 stores in advance the correspondence relationship between the impedance characteristic relationship value and the total capacity. The corresponding correspondence relationship can be created by machine learning using the measurement-purpose secondary battery, or created based on the actual measurement value obtained by performing an accelerated deterioration test by using the measurement-purpose secondary battery, or created by a calculation formula that logically derives the correspondence relationship between the impedance characteristic relationship value and the total capacity in a predetermined voltage by using the model of the secondary battery.

In the present embodiment 3, the capacity estimation unit 62 shown in FIG. 14 estimates the total capacity of the secondary batteries 21 to 26 based on the discharging voltage characteristic acquired by the battery characteristic acquisition unit 61 and the impedance characteristic relationship value acquired by the impedance characteristic relationship value acquisition unit 64. The determination unit 63 determines the deterioration degree of the secondary batteries 21 to 26 based on the estimation result of the capacity estimation unit 62 as in the case of the embodiment 1. According to the present embodiment 3, the total capacity is estimated based on the discharging voltage characteristic and the impedance characteristic relationship value, and thus the determination accuracy can be further improved.

In the present embodiment, the timing at which the impedance characteristic relationship value acquisition unit 64 acquires the impedance characteristic relationship value is not particularly limited, and for example, may be at the charging end time when the battery characteristic acquisition unit 61 acquires the charging voltage characteristic as in the embodiment 2.

According to the deterioration degree determination device 1 of the present embodiment 3, the battery pack includes the multiple secondary batteries having the usage history, and the battery pack can be provided in which the difference in the deterioration degree of each of the multiple secondary batteries, which is determined based on the total capacity estimated by using the battery characteristic and the impedance characteristic relationship value related to the impedance when the secondary battery is charged or discharged, is within a predetermined range. In such a battery pack, the variation in the deterioration degree of the secondary battery included in the battery pack becomes smaller, and thus the lifetime of the battery pack as a rebuilt product can be extended and the quality improvement can be attempted.

Embodiment 4

Figure 15:
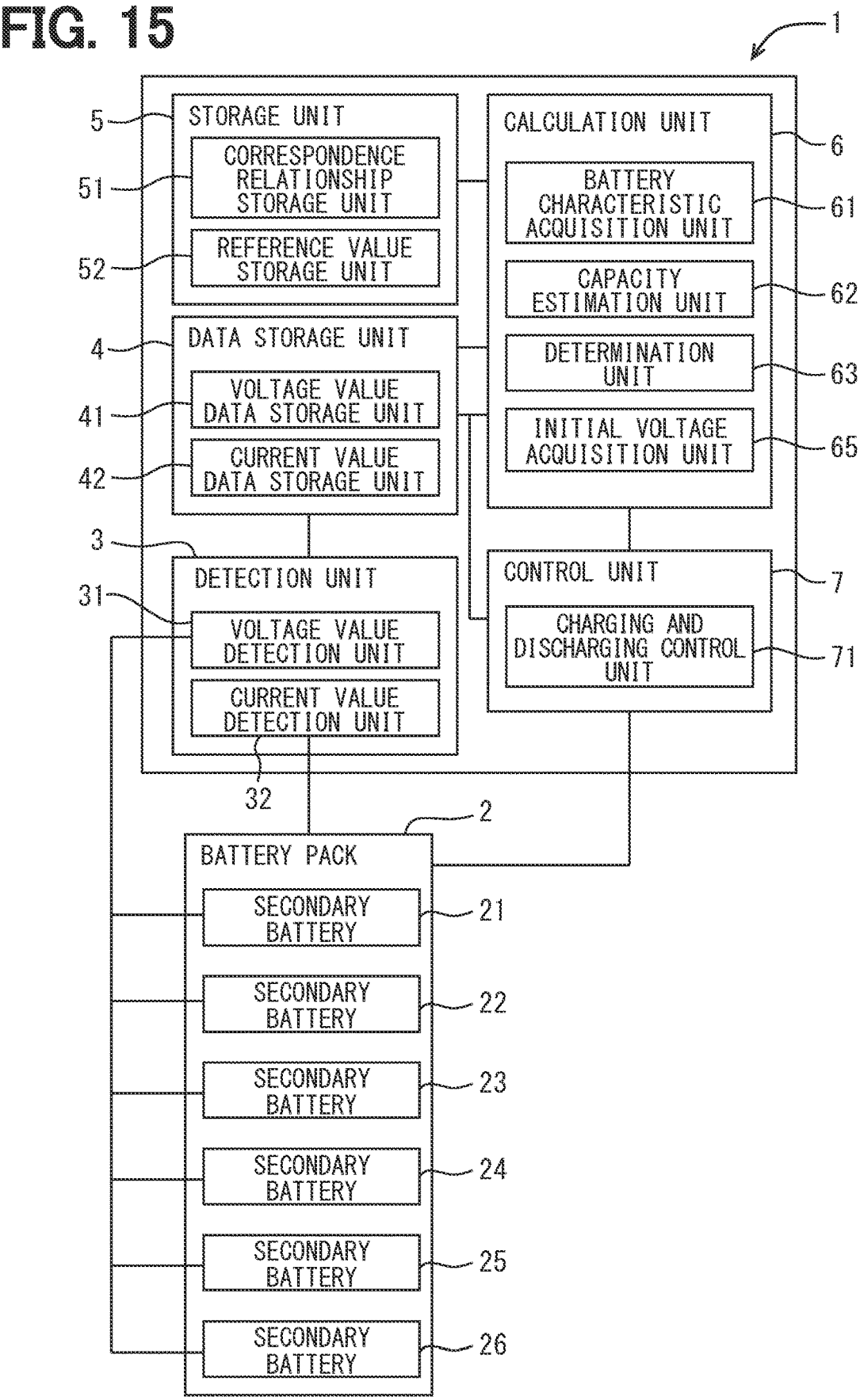
FIG. 15 is a conceptual diagram showing a configuration of a deterioration degree determination device in an embodiment 4.
Figure 16:
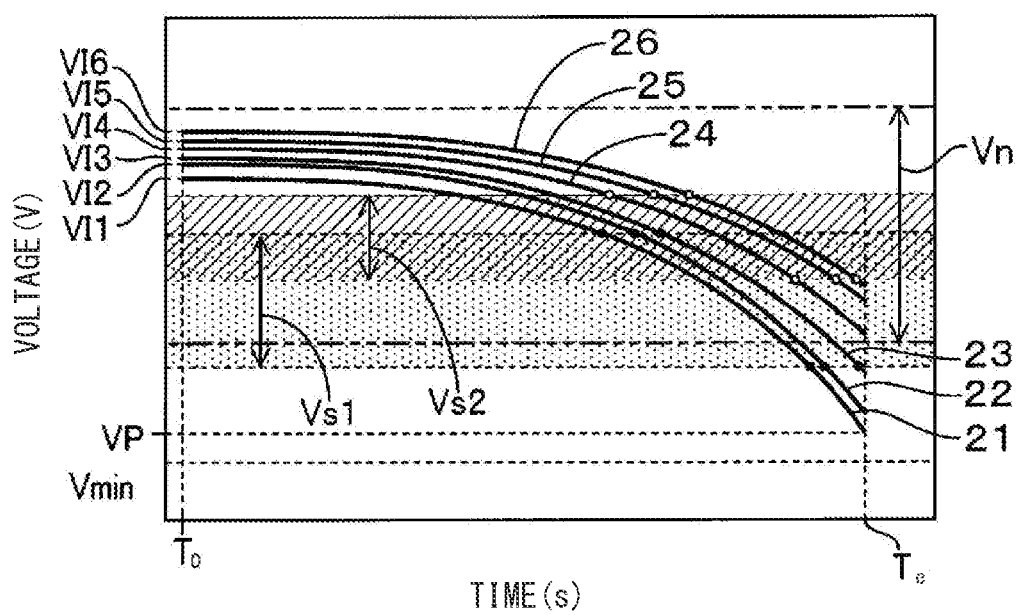
FIG. 16 is a conceptual diagram showing a battery characteristic in an embodiment 4.

In the present embodiment 4, in addition to the configuration of the embodiment 1, an initial voltage acquisition unit 65 is provided as shown in FIG. 15. As shown in FIG. 16, the initial voltage acquisition unit 65 acquires initial voltages VI1 to VI6 that are the open circuit voltages of the secondary batteries 21 to 26 at the discharging start time T0, respectively. The correspondence relationship memory unit 51 stores in advance the correspondence relationship among the initial voltage value, the battery characteristic, and the total capacity. The correspondence relationship can be created as in the case of the embodiment 1. Other configurations are the same as those of the embodiment 1, and the same reference numerals are given to the same configurations of the embodiment 1, and the description thereof will be omitted.

According to the deterioration degree determination device 1 of the present embodiment 4, the deterioration degree of the secondary batteries 21 to 26 is determined also in consideration of the initial voltage in addition to the battery characteristic, and thus the determination accuracy can be further improved with a simple configuration. Instead of the initial voltage, the initial voltage relationship value calculated based on the initial voltage may be used. As the initial voltage relationship value, for example, an absolute value of the initial voltage or a difference of the initial voltage acquired by the initial voltage acquisition unit 65 can be used.

According to the deterioration degree determination device 1 of the present embodiment 4, the battery pack includes the multiple secondary batteries including the usage history, and the battery pack can be provided in which the difference in the deterioration degree of each of the multiple secondary batteries, which is determined based on the total capacity estimated by using the battery characteristic and the initial voltage that is the open circuit voltage of the secondary batteries when the acquisition of the battery characteristic is started, is within a predetermined range. In such a battery pack, the variation in the deterioration degree of the secondary battery included in the battery pack becomes smaller, and thus the lifetime of the battery pack as a rebuilt product can be extended and the quality improvement can be attempted.

Also in the present embodiment 4, as in the modified embodiment in the embodiment 1, the determination unit 63 may determine the deterioration degree of the secondary batteries 21 to 26 based on the battery characteristic acquired by the battery characteristic acquisition unit 61 without estimating the total capacity by the capacity estimation unit 62. The determination unit 63 may determine the deterioration degree of the secondary batteries 21 to 26 based on the battery characteristic acquired by the battery characteristic acquisition unit 61 and the initial voltage. The battery characteristic acquisition unit 61 may acquire the absolute value of the acquired value as the battery characteristic, and the determination unit 63 may determine the deterioration degree based on the corresponding absolute value. The determination unit 63 may determine the deterioration degree of the secondary batteries 21 to 26 based on the difference in the battery characteristic acquired by the battery characteristic acquisition unit 61. The battery pack may be assembled by classifying the secondary batteries into classes such that the difference between the deterioration degrees of the secondary batteries is within a predetermined range.

Figure 17:
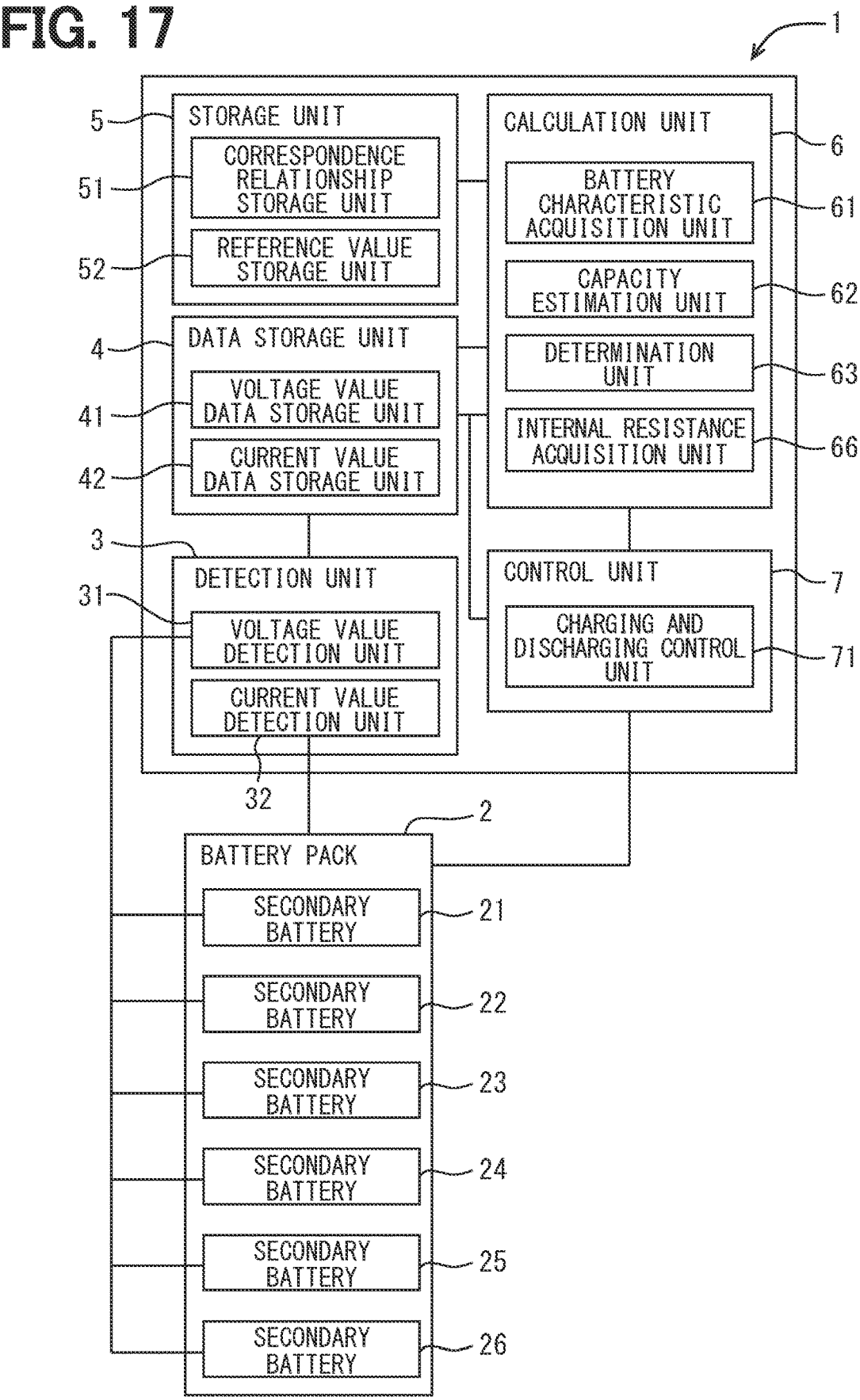
FIG. 17 is a conceptual diagram showing a configuration of a deterioration degree determination device in a modified embodiment 5.

As another modified embodiment 5, as shown in FIG. 17, the calculation unit 6 may have an internal resistance acquisition unit 66 that acquires the internal resistance of the secondary battery 21, and the correspondence relationship memory unit 51 may store in advance the correspondence relationship among the internal resistance, the battery characteristic, and the total capacity. In the internal resistance acquisition unit 66, the internal resistance can be calculated and acquired from the measured voltage, which is the voltage value itself detected by the voltage value detection unit 31, the open circuit voltage of the secondary batteries 21 to 26, and the current flowing through the secondary batteries 21 to 26. The open circuit voltage of the secondary batteries 21 to 26 can be estimated and acquired for each time by using a map showing the correspondence relationship between the residual discharge amount and the initial voltage of the secondary batteries 21 to 26. The internal resistance can also be estimated and acquired by using an estimation formula that logically derives the internal resistance of the secondary battery. According to the deterioration degree determination device 1 of the present modified embodiment 5, the deterioration degree of the secondary batteries 21 to 26 is determined also in consideration of the internal resistance in addition to the battery characteristic, and thus the determination accuracy can be further improved with a simple configuration.

In the modified embodiment 5, the internal resistance is acquired separately from the battery characteristic to determine the deterioration degree, but instead of the above-mentioned, as the battery characteristic, the change in the internal resistance may be acquired based on the voltage transition in a predetermined voltage section.

Embodiment 5

Figure 18:
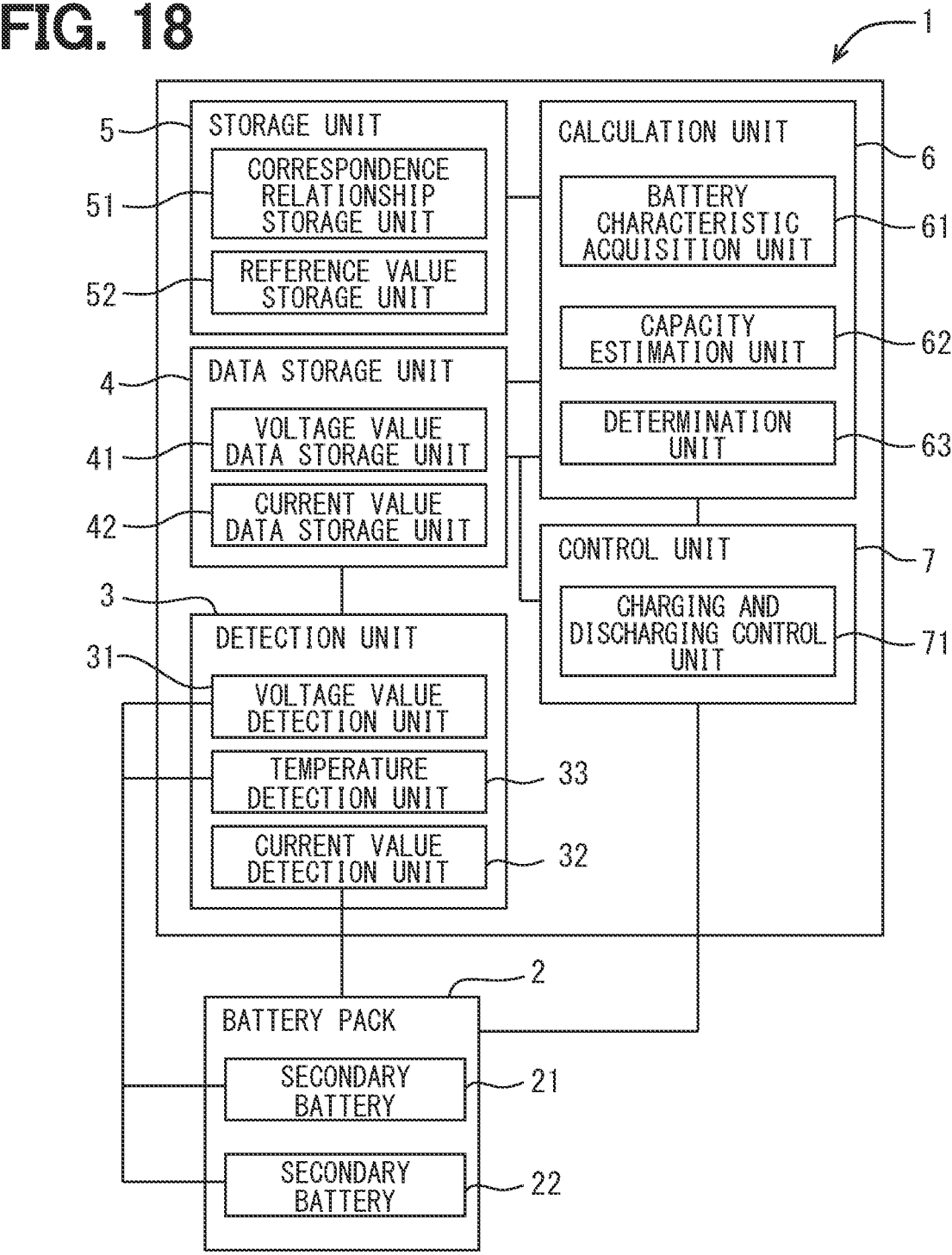
FIG. 18 is a conceptual diagram showing a configuration of a deterioration degree determination device in an embodiment 5.

As shown in FIG. 18, the deterioration degree determination device 1 of the present embodiment 5 includes a temperature detection unit 33 in addition to the configuration of the embodiment 1 shown in FIG. 1, and the battery pack 2 includes the secondary batteries 21 and 22. As shown in (a) in FIG. 19 and (b) in FIG. 19, the temperature detection unit 33 acquires the temperature of the secondary batteries 21 and 22 during the charging and discharging operation. In the above-described present embodiment 1, the battery characteristic acquisition unit 61 is configured to acquire the discharging voltage characteristic based on the voltage transition of the secondary batteries 21 and 22 in the predetermined voltage section Vs as the battery characteristic, but in the present embodiment 5, instead of the above-mentioned, the battery characteristic acquisition unit 61, as shown in (a) in FIG. 19, acquires the temperature characteristic based on the temperature transition of the secondary batteries 21 and 22 in predetermined voltage sections VsA and VsB as the battery characteristic. In the present embodiment 5, the voltage section VsA indicates the voltage section from a voltage V1 to a voltage V2, and the voltage section VsB indicates the voltage section from a voltage V3 to a voltage V4.

In the present embodiment, as shown in (a) in FIG. 19 and (b) in FIG. 19, as the temperature characteristic, a first discharging temperature characteristic TA1 corresponding to the voltage section VsA in the first secondary battery 21 and a first charging temperature characteristic TB1 corresponding to the voltage section VsB are set. As the temperature characteristic, a second discharging temperature characteristic TA2 corresponding to the voltage section VsA in the second secondary battery 22 and a second charging temperature characteristic TB2 corresponding to the voltage section VsB are set. Other configurations are the same as those of the embodiment 1, and the same reference numerals are given to the same configurations of the embodiment 1, and the description thereof will be omitted. The voltage section VsA is a section in which the difference in the discharging voltage characteristic is remarkable according to the deterioration degree of the secondary batteries 21 and 22, and the voltage section VsB is a section in which the difference in the charging voltage characteristic is remarkable according to the deterioration degree of the secondary batteries 21 and 22.

Although the secondary batteries 21 and 22 are incorporated in the same battery pack 2, the temperature transition in charging and discharging may show different behaviors depending on the disposition, the temperature environment, and the like of the secondary batteries 21 and 22. In the present embodiment 5, as shown in (b) in FIG. 19, the temperature transitions in the first secondary battery 21 and the second secondary battery 22 are within a measured room temperature setting range Tn, but show slightly different behaviors from each other. In the present embodiment 5, the battery characteristic acquisition unit 61 acquires the discharging temperature characteristics TA1 and TA2 that are the temperature characteristic in discharging and the charging temperature characteristics TB1 and TB2 that are the temperature characteristic in charging, based on the battery temperature detected by the temperature detection unit 33 in both the predetermined voltage section VsA in discharging and the predetermined voltage section VsB in charging after discharging. The capacity estimation unit 62 estimates the total capacity of each of the secondary batteries 21 and 22 based on both temperature characteristics, and the determination unit 63 determines the deterioration degree.

The temperature characteristic acquired by the battery characteristic acquisition unit 61 can be, as in the case of calculating the discharging voltage characteristic in the case of the embodiment 1 and the case of calculating the charging voltage characteristic in the case of the embodiment 2, the differential value of the temperature change of the predetermined voltage in the predetermined voltage sections VsA and VsB, the ratio of the temperature change between two points in the predetermined voltage sections VsA and VsB, and the ratio of the temperature change of the secondary batteries 21 and 22 to the capacity change of the secondary batteries 21 and 22 in the voltage sections VsA and VsB.

Also in the present embodiment 5, the same operation effect as in the case of the embodiment 1 can be obtained. In the present embodiment 5, the temperature characteristic is acquired in both discharging and charging but is not limited thereto, and only one of discharging and charging may be used.

According to the deterioration degree determination device 1 of the present embodiment 5, the battery pack includes the multiple secondary batteries having the usage history, and the battery pack can be provided in which the difference in the deterioration degree of each of the multiple secondary batteries, which is determined based on the total capacity estimated by using the battery characteristic including the temperature characteristic based on the temperature transition of the secondary battery in the predetermined voltage sections VsA and VsB, is within a predetermined range. In such a battery pack, the variation in the deterioration degree of the secondary battery included in the battery pack 2 becomes smaller, and thus the quality improvement of the battery pack as a rebuilt product can be attempted.

Also in the present embodiment 5, as in the modified embodiment in the embodiment 1, the determination unit 63 may determine the deterioration degree of the secondary batteries 21 to 22 based on the temperature characteristic acquired by the battery characteristic acquisition unit 61 without estimating the total capacity by the capacity estimation unit 62. The battery characteristic acquisition unit 61 may acquire the absolute value of the acquired value as the temperature characteristic, and the determination unit 63 may determine the deterioration degree based on the corresponding absolute value. The determination unit 63 may determine the deterioration degree of the secondary battery based on the difference in the temperature characteristic acquired by the battery characteristic acquisition unit 61. The battery pack may be assembled by classifying the secondary batteries into classes such that the difference between the deterioration degrees of the secondary batteries is within a predetermined range.

Figure 20:
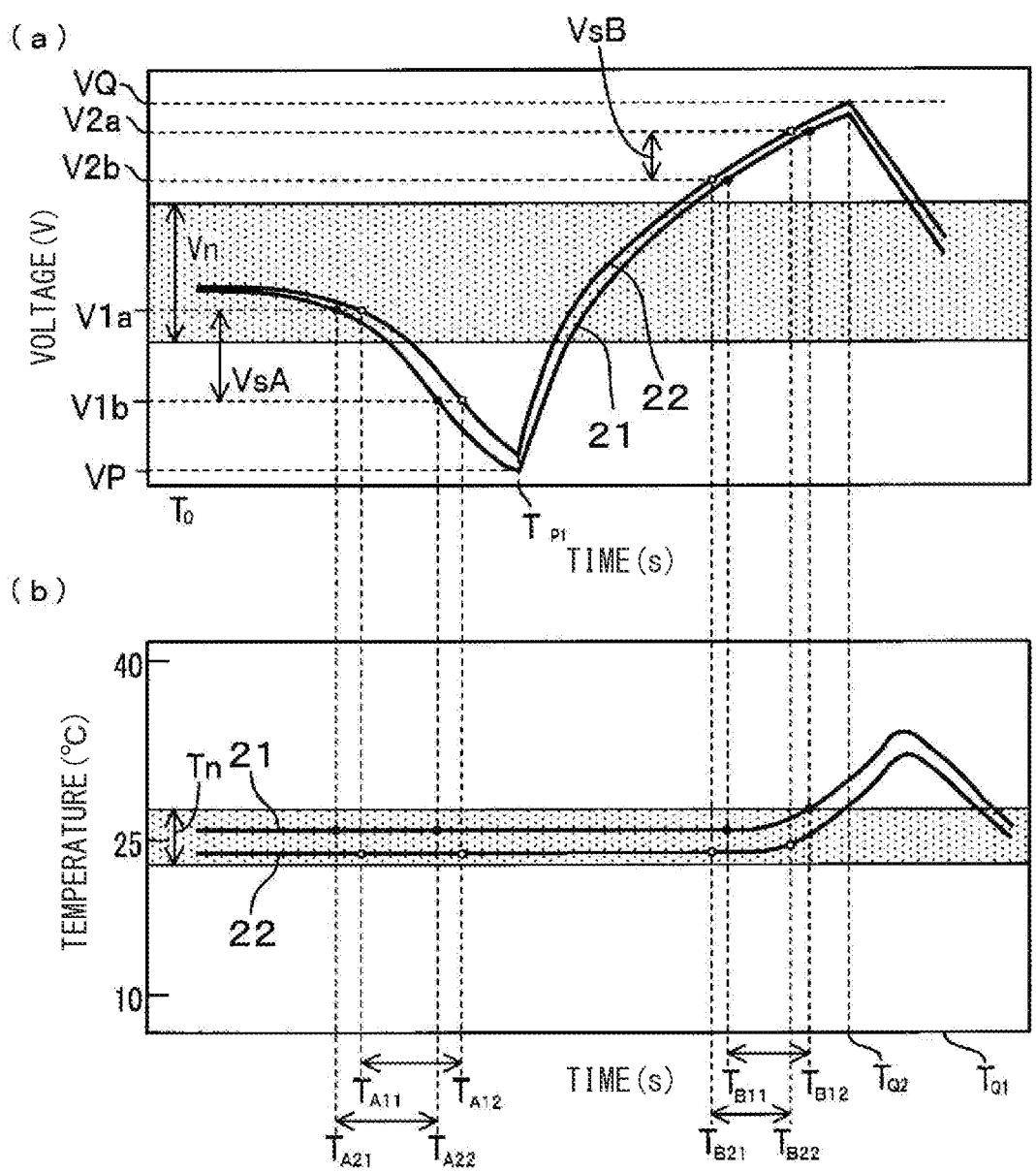
FIG. 20 is a conceptual diagram showing a battery characteristic in a modified embodiment 6.

In the present embodiment 5, as shown in (a) in FIG. 19, as the temperature characteristic at the charging time, the temperature characteristic is acquired when the charging target voltage VQ is within the normal use range Vn and the predetermined voltage section VsB is within the normal use range Vn, but instead of the above-mentioned, as in a modified embodiment 6 shown in (a) in FIG. 20, as the temperature characteristic at the charging time, the temperature characteristic may be acquired when the charging target voltage VQ exceeds the normal use range Vn and the predetermined voltage section VsB is in an area beyond the normal use range Vn. In this case, as shown in (b) in FIG. 20, the temperature of the secondary batteries 21 and 27 easily rises, and thus the deterioration degree is easily reflected in the temperature transition. As a result, the determination accuracy can be improved. In the present modified embodiment 6, the secondary batteries 21 and 27 are charged to the charging target voltage VQ and then discharged to return the voltage of the secondary batteries 21 and 22 to the normal use range Vn.

Figure 21:
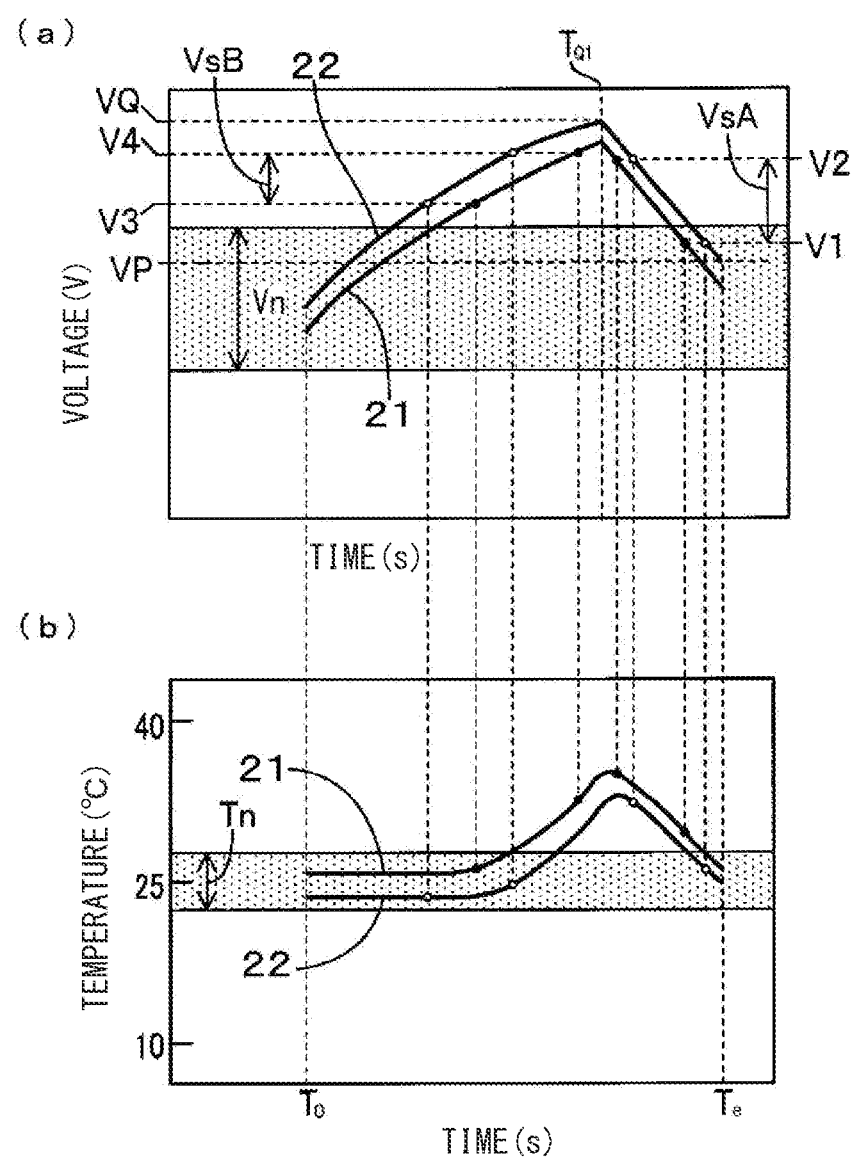
FIG. 21 is a conceptual diagram showing a battery characteristic in a modified embodiment 7.

In the modified embodiment 6, the secondary battery 2 is discharged, then charged, and then discharged again, but instead of the above-mentioned, as in a modified embodiment 7 shown in FIG. 21, the battery may be charged first and then discharged without first discharging. In this case, the battery characteristic acquisition unit 61 may acquire the charging time temperature characteristic at the charging time and then acquire the discharging time temperature characteristic at the discharging time. Also in this case, the same operation effect as the operation effect of the embodiment 1 is obtained.

Embodiment 6

Figure 22:
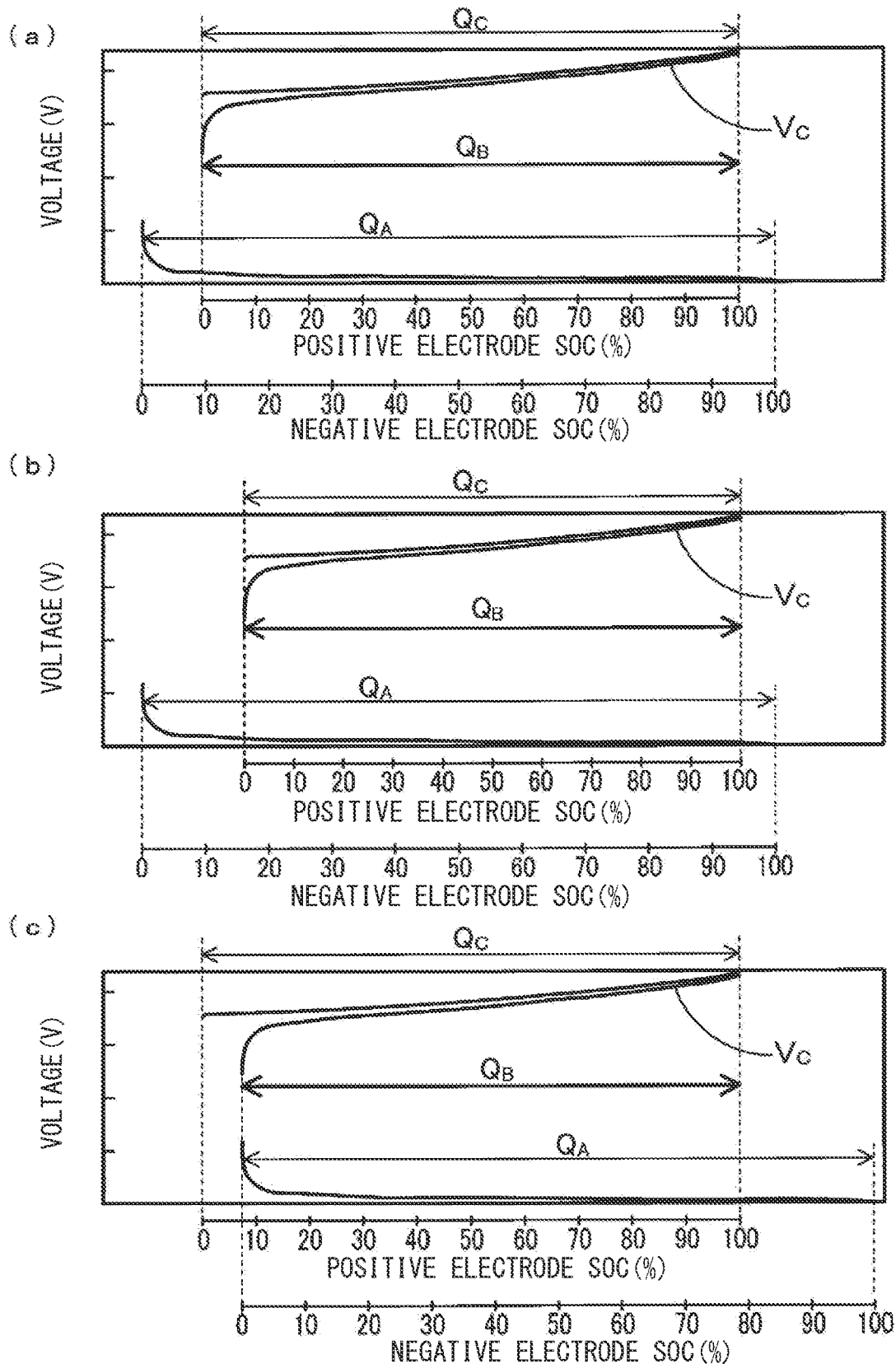
FIG. 22 is a conceptual diagram showing an SOC-OCV curve of a secondary battery in an embodiment 6.

In the above-described embodiment 1, the capacity estimation unit 62 as the estimation unit estimates the total capacity of the secondary battery 2 based on the battery characteristic acquired by the battery characteristic acquisition unit 61, but is not limited thereto, and the capacity estimation unit 62 may estimate at least one of the positive electrode capacity, the negative electrode capacity, the deviation amount of the relative relationship between the negative electrode SOC and the positive electrode SOC, the total capacity variation among the multiple cells forming the secondary batteries 21 to 26, and the battery resistance, positive electrode resistance, and negative electrode resistance of the secondary batteries 21 to 26. In the embodiment 6, the capacity estimation unit 62 estimates a positive electrode capacity Qc of each of the secondary batteries 21 to 26. The correspondence relationship memory unit 51 stores the correspondence relationship between the battery characteristic and the positive electrode capacity Qc. The form of the corresponding correspondence relationship and the method for creating the correspondence relationship are not particularly limited, and can be, for example, a calculation formula, a map, a graph, and a table, as in the case of the embodiment 1. The corresponding correspondence relationship can be created by machine learning using the measurement-purpose secondary battery 2, or created based on the actual measurement value obtained by performing an accelerated deterioration test by using the measurement-purpose secondary battery 2, or created by a calculation formula that logically derives the correspondence relationship between the battery characteristic and the total capacity in a predetermined voltage section by using the model of the secondary battery 2. In the present embodiment, the correspondence relationship memory unit 51, for example, stores the correspondence relationship between the battery characteristic and the positive electrode capacity Qc based on the prediction model shown in (a) to (c) in FIG. 22. Other configurations are the same as in the case of the embodiment 1, and the same reference numerals as those in the case of the embodiment 1 are assigned and the description thereof will be omitted.

Next, a method for determining the deterioration degree by the deterioration degree determination device 1 of the present embodiment 6 will be described below. The description of the same steps as in the case of the embodiment 1 shown in FIG. 6 may be omitted by using the same reference numerals.

Figure 23:
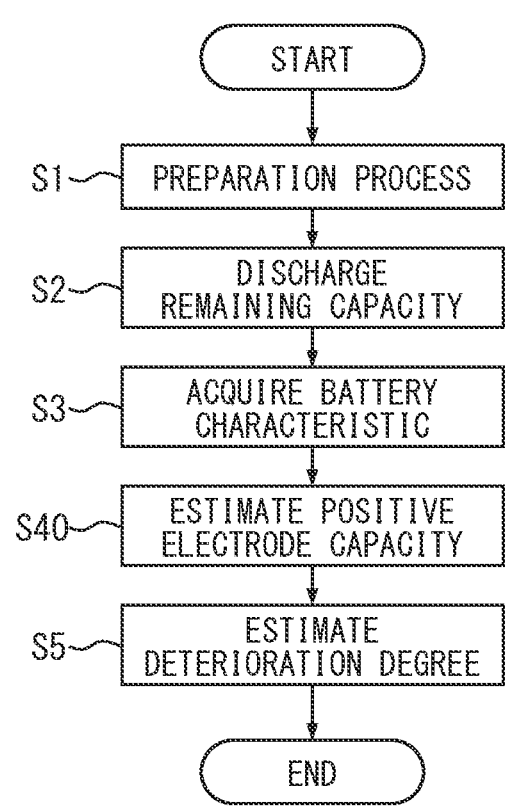
FIG. 23 is a flowchart showing a method for determining a deterioration degree of the secondary battery in the embodiment 6.

First, in the present embodiment 6, the steps S1 to S3 shown in FIG. 23 are performed as in the case of the embodiment 1 shown in FIG. 6. Accordingly, as shown in (a) in FIG. 24, the battery characteristic acquisition unit 61 acquires a discharging curve as the battery characteristic of each of the secondary batteries 21 to 26 in the predetermined voltage section Vs. The predetermined voltage section can be a section corresponding to a specific SOC range.

Next, in a step S40 shown in FIG. 23, the capacity estimation unit 62 estimates the positive electrode capacity Qc of the secondary batteries 21 to 26 from the discharging curve acquired by the battery characteristic acquisition unit 61 based on the correspondence relationship between the battery characteristic and the positive electrode capacity Qc based on the prediction model stored in the correspondence relationship memory unit 51. Thereafter, in the step S5 shown in FIG. 23, the determination unit 63 determines the deterioration degree of the secondary batteries 21 to 26 based on the positive electrode capacity Qc estimated by the capacity estimation unit 62.

The present embodiment 6 also has the same operation effect as the operation effect of the embodiment 1. In the present embodiment 6, the battery characteristic acquisition unit 61 acquires the discharging curve shown in (a) in FIG. 24, but instead of the above-mentioned, may acquire the charging curve shown in (b) in FIG. 24. Also in this case, the same operation effect as the operation effect of the embodiment 1 is obtained.

Embodiment 7

Figure 25:
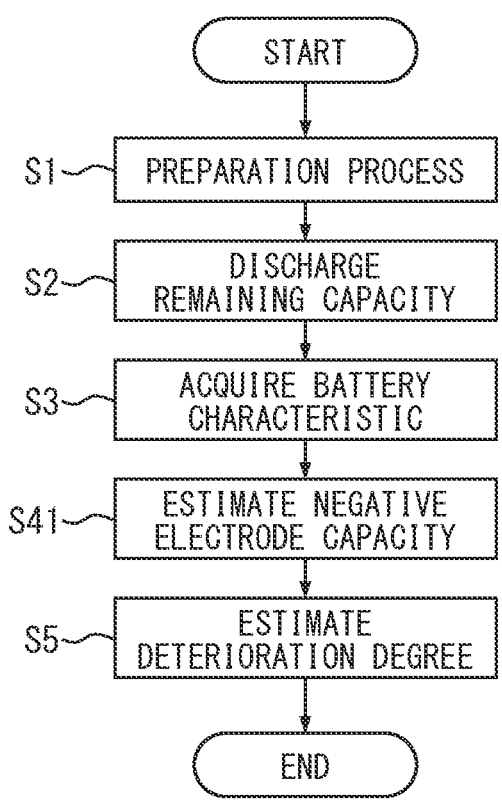
FIG. 25 is a flowchart showing a method for determining a deterioration degree of a secondary battery in an embodiment 7.

In the embodiment 6, the capacity estimation unit 62 estimates the positive electrode capacity Qc, but instead of the above-mentioned, in the embodiment 7, the capacity estimation unit 62 estimates a negative electrode capacity QA. That is, in the embodiment 7, as shown in FIG. 25, in a step S41, based on the prediction model shown in (a) to (c) in FIG. 22, the negative electrode capacity QA of the secondary batteries 21 to 26 is estimated based on the correspondence relationship between the battery characteristic and the negative electrode capacity QA. The embodiment 7 also has the same operation effect as the operation effect of the embodiment 1.

Embodiment 8

In the present embodiment 8, the capacity estimation unit 62 estimates the deviation amount of the relative relationship between the negative electrode SOC and the positive electrode SOC of each of the secondary batteries 21 to 26. The correspondence relationship memory unit 51 stores the correspondence relationship between the battery characteristic and the deviation amount of in the relative relationship between the negative electrode SOC and the positive electrode SOC. The form of the corresponding correspondence relationship and the method for creating the correspondence relationship are not particularly limited, and can be as in the case of the embodiment 1.

Figure 26:
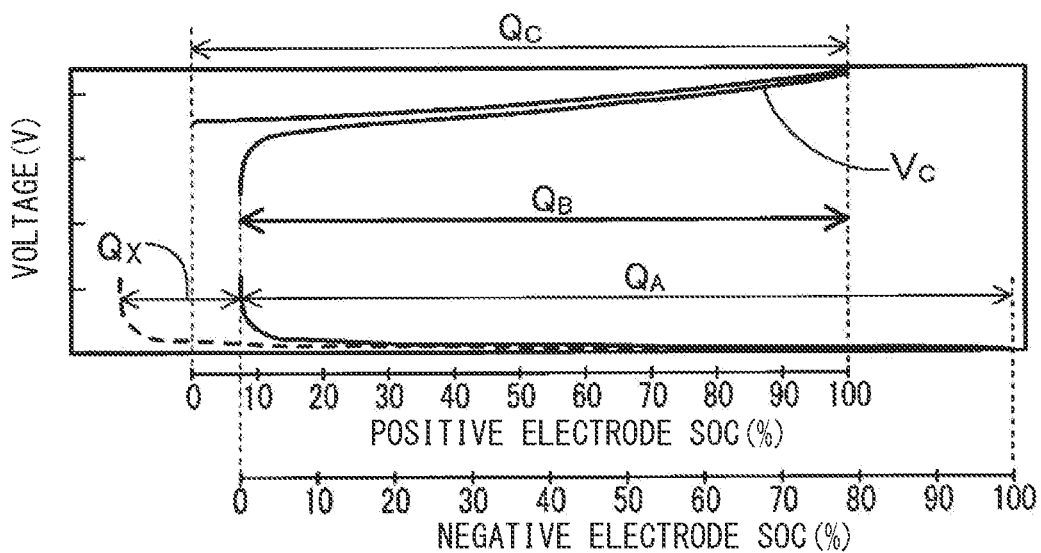
FIG. 26 is a conceptual diagram showing an SOC-OCV curve of a secondary battery in an embodiment 8.

For example, when the secondary batteries 21 to 26 are made of nickel-metal hydride batteries, as shown in FIG. 26, when hydrogen escapes from the reaction system in the battery container, the relative relationship between the negative electrode SOC and the positive electrode SOC deviates, and the OCV curve of the negative electrode deviates to the right side of the figure. For example, when the secondary batteries 21 to 26 are configured with lithium ion batteries, as shown in FIG. 26, the lithium in the electrolytic solution is consumed in the formation of the solid electrolyte interface (SEI) film, such that the relative relationship between the negative electrode SOC and the positive electrode SOC deviates, and thus the OCV curve of the negative electrode deviates to the right side of the figure.

In the present embodiment 8, based on the prediction model shown in FIG. 26, the correspondence relationship memory unit 51 stores the correspondence relationship between a deviation amount Qx of the relative relationship between the negative electrode SOC and the positive electrode SOC, and the battery characteristic. Other configurations are the same as in the case of the embodiment 1, and the same reference numerals as those in the case of the embodiment 1 are assigned and the description thereof will be omitted.

Figure 27:
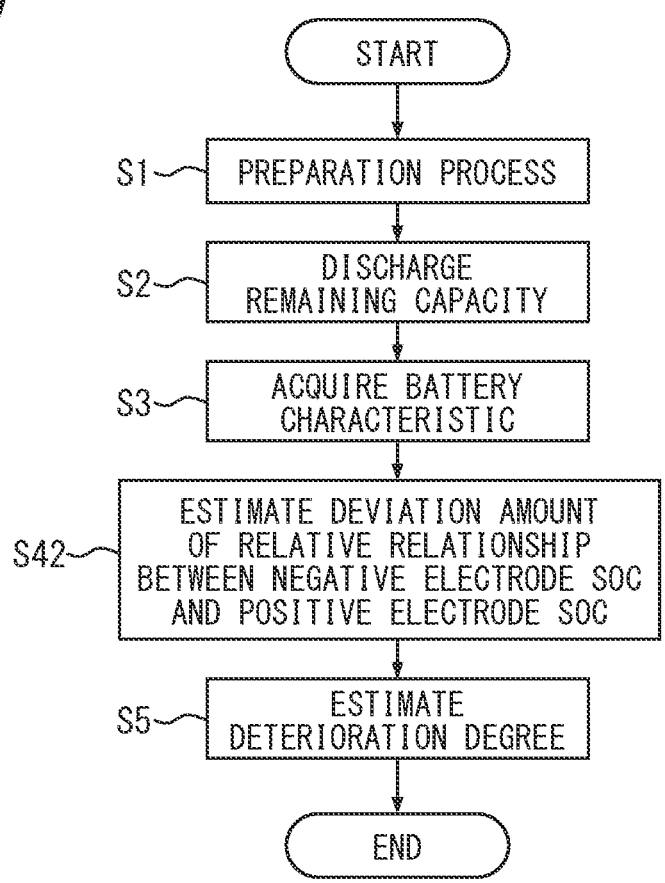
FIG. 27 is a flowchart showing a method for determining a deterioration degree of a secondary battery in an embodiment 9.

A method for determining the deterioration degree by the deterioration degree determination device 1 of the present embodiment 8 is performed as in the case of the above-mentioned embodiment 6, but as shown in FIG. 27, in the step S3, the battery characteristic acquisition unit 61 acquires, as the battery characteristic, a discharging curve of the predetermined voltage section Vs corresponding to a low SOC range as the battery. Thereafter, in a step S42, the deviation amount Qx of the secondary batteries 21 to 26 is estimated based on the correspondence relationship between the battery characteristic calculated from the corresponding discharging curve, and the deviation amount Qx of the relative relationship between the negative electrode SOC and the positive electrode SOC stored in the correspondence relationship memory unit 51. Thereafter, in the step S5 shown in FIG. 27, the determination unit 63 determines the deterioration degree of the secondary batteries 21 to 26 based on the deviation amount Qx estimated by the capacity estimation unit 62. The present embodiment also has the same operation effect as in the operation effect of the embodiment 1. In the present embodiment 8, the battery characteristic is acquired from a low SOC range as the battery, but instead of the above-mentioned, may be acquired from a high SOC range. In the present embodiment 8, the discharging curve is acquired as the battery characteristic, but the charging curve may be acquired.

Embodiment 9

In the present embodiment 9, the correspondence relationship memory unit 51 stores the correspondence relationship between the battery characteristic, and the amount of change of the discharging capacity in the charging and discharging curve for each of the secondary batteries 21 to 26, the capacity estimation unit 62 estimates the amount of change of the discharging capacity in the charging and discharging curve in the predetermined voltage section Vs, and the determination unit 63 detects whether the self-discharge amount of the cell increases based on the estimation result as the deterioration degree. In the present embodiment 9, other configurations are the same as in the case of the embodiment 1, and the same reference numerals as those in the case of the embodiment 1 are assigned and the description thereof will be omitted.

In the present embodiment 9, each of the secondary batteries 21 to 26 has six cells. For example, the discharging curve shown in (a) in FIG. 28 is stored in the correspondence relationship memory unit 51 as a discharging curve showing an initial state, and the discharging curve shown in (b) in FIG. 28 is stored in the correspondence relationship memory unit 51 as a discharging curve indicating that one of the cells has an increasing self-discharge amount. When the discharging curve shown in (a) in FIG. 28 is estimated by the capacity estimation unit 62 based on the battery characteristic of the predetermined voltage section Vs, the determination unit 63 determines that there is no cell having the increasing self-discharge amount. When the discharging curve shown in (b) in FIG. 28 is estimated by the capacity estimation unit 62 based on the battery characteristic of the predetermined voltage section Vs, the determination unit 63 determines that there is a cell having the increasing self-discharge amount. When the discharging curve shown in (b) in FIG. 28 is estimated, the use lower limit can be set to a second use lower limit Vmin2 that is a value higher than a first use lower limit Vmin1 that is for a case where there is no cell having an increasing self-discharge amount in the secondary battery module. Accordingly, each cell can be prevented from being excessively discharged.

Embodiment 10

Figure 29:
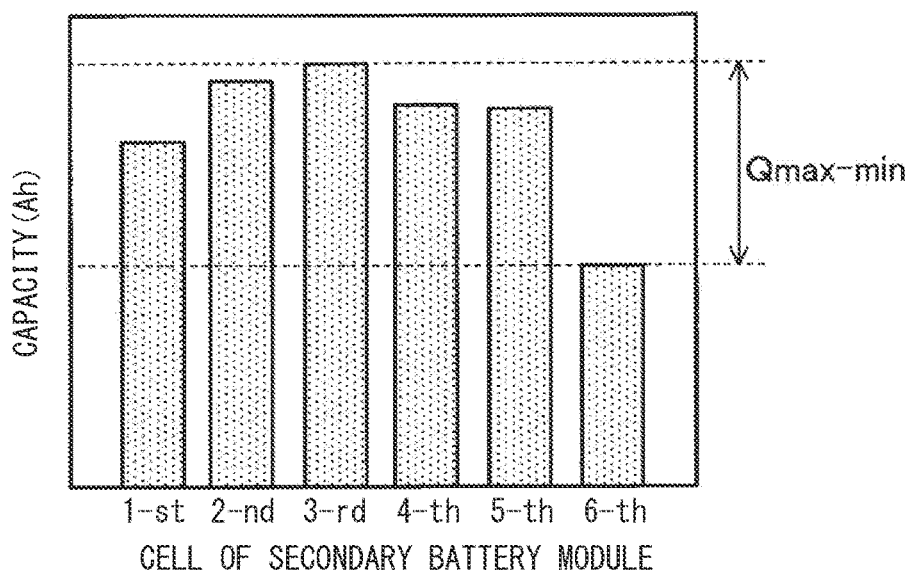
FIG. 29 is a conceptual diagram showing an example of an estimation result in an embodiment 10.

In the present embodiment 10, each of the secondary batteries 21 to 26 includes six cells. The correspondence relationship memory unit 51 stores the correspondence relationship between the total capacity variation between the cells in one of the secondary batteries 21 to 26 and the battery characteristic. The total capacity variation between the cells indicates the degree of variation in the total capacity of each cell in multiple cells included in one of the secondary batteries 21 to 26. In the present embodiment 10, as the total capacity variation between the cells, as shown in FIG. 29, a difference Qmax-min obtained by subtracting a minimum Qmin from a maximum Qmax in the total capacity of the multiple cells is adopted. Other configurations are the same as in the case of the embodiment 1, and the same reference numerals as those in the case of the embodiment 1 are assigned and the description thereof will be omitted.

In the present embodiment 10, the capacity estimation unit 62 estimates the difference Qmax-min from the correspondence relationship stored in the correspondence relationship memory unit 51 based on the battery characteristic acquired by the battery characteristic acquisition unit 61. The determination unit 63 detects the presence or absence of specific capacity deterioration of the cell based on the estimated difference Qmax-min. For example, when the estimated difference Qmax-min is determined to be equal to or greater than a predetermined value, determination is made that specific capacity deterioration occurs in one of the cells of the corresponding secondary battery module.

Embodiment 11

Figure 30:
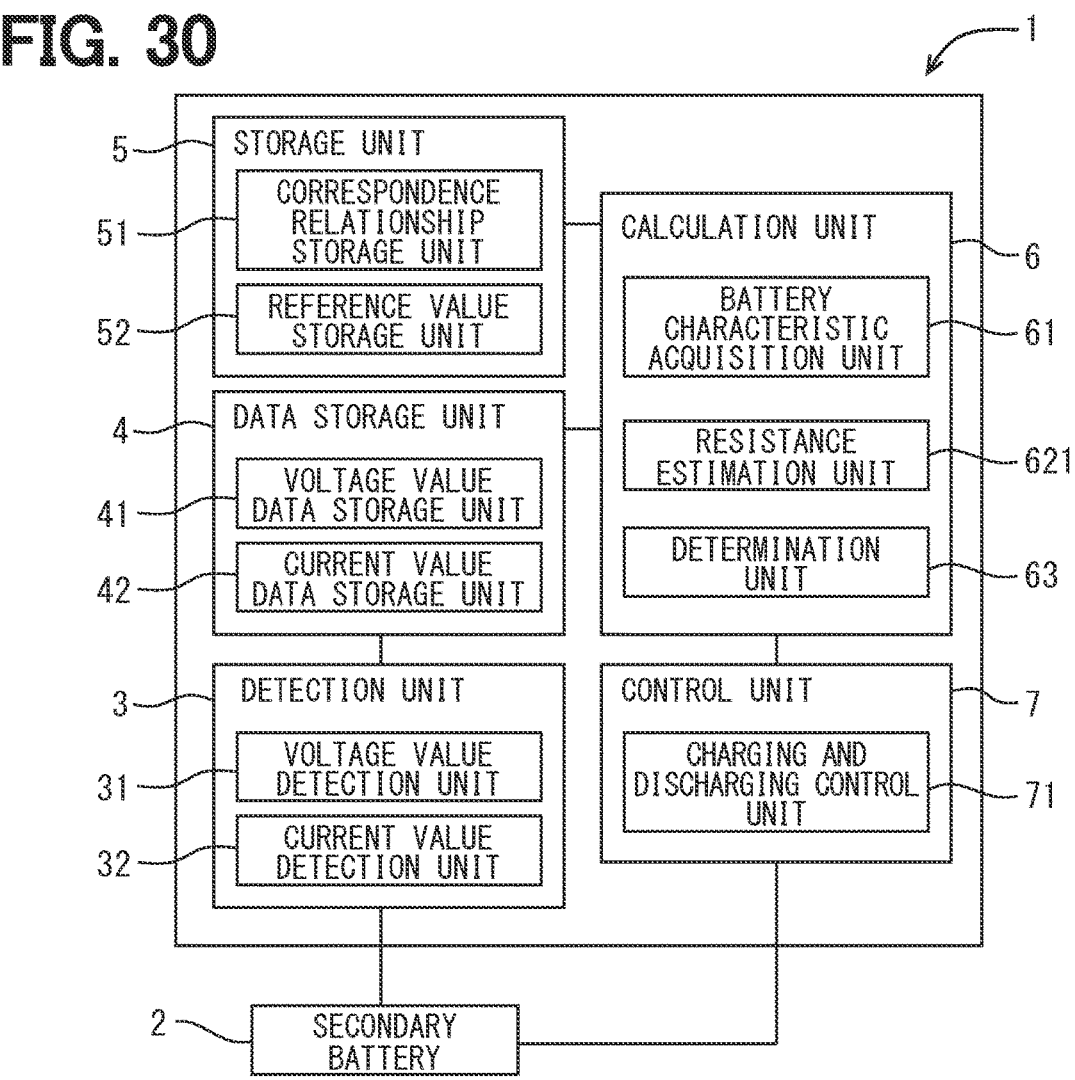
FIG. 30 is a conceptual diagram showing a configuration of a deterioration degree determination device in an embodiment 11.

As shown in FIG. 30, the embodiment 11 has a resistance estimation unit 621 as an estimation unit. The resistance estimation unit 621 estimates the internal resistance of the secondary batteries 21 to 26 based on the battery characteristic of the secondary batteries 21 to 26. The correspondence relationship memory unit 51 stores the correspondence relationship between the internal resistance and the battery characteristic of one of the secondary batteries 21 to 26. The battery characteristic acquisition unit 61 can acquire the battery characteristic by performing a pulse charging and discharging operation in a state of stack in which the secondary batteries 21 to 26 are connected to each other. The voltage section for acquiring the battery characteristic can be a predetermined voltage section corresponding to a specific SOC range.

When the temperature and SOC are different between the secondary batteries 21 to 26, the temperature and the voltage change during the charging and discharging operation or the voltage change during the voltage relaxation after the charging and discharging operation are acquired as the battery characteristic, and the resistance value can be estimated when the temperature and SOC are the same conditions. In this case, the correspondence relationship memory unit 51 stores the correspondence relationship between the internal resistance, the temperature, and the battery characteristic of one of the secondary batteries 21 to 26. The secondary batteries 21 to 26 may be individually charged and discharged to acquire the battery characteristic. In this case, it is not necessary to adjust the temperature and SOC to the same conditions, and the determination time can be shortened.

Figure 31:
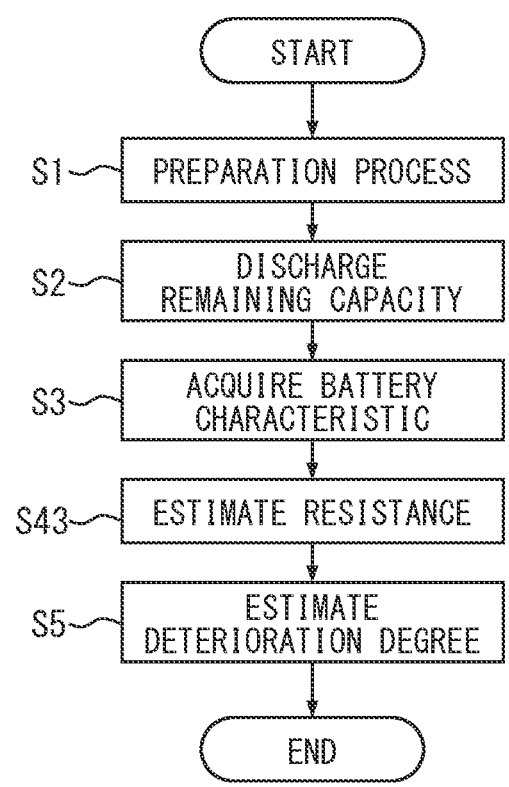
FIG. 31 is a flowchart showing a method for determining a deterioration degree of a secondary battery in the embodiment 11.

Next, a method for determining the deterioration degree by the deterioration degree determination device 1 of the present embodiment 11 will be described below. First, in the present embodiment 6, the steps S1 to S3 shown in FIG. 31 are performed as in the case of the embodiment 1 shown in FIG. 11. Next, in a step S43 shown in FIG. 31, the resistance estimation unit 621 acquires the internal resistance of the secondary batteries 21 to 26 from the battery characteristic acquired by the battery characteristic acquisition unit 61, based on the correspondence relationship between the battery characteristic and the internal resistance of the secondary batteries 21 to 26 stored in the correspondence relationship memory unit 51. Thereafter, in the step S5 shown in FIG. 31, the determination unit 63 determines the deterioration degree of the secondary batteries 21 to 26 based on the internal resistance estimated by the resistance estimation unit 621. The present embodiment 11 also has the same operation effect as the operation effect of the embodiment 1.

Embodiment 12

In the deterioration degree determination device 1 of the embodiment 12, the resistance estimation unit 621 estimates the negative electrode resistance of the secondary batteries 21 to 26, and the determination unit 63 determines the deterioration degree of the secondary batteries 21 to 26.

From the frequency characteristic in the voltage curve of the secondary batteries 21 to 26, the resistance value of the positive electrode, the negative electrode, and other battery elements in the secondary batteries 21 to 26 can be calculated. In nickel-metal hydride batteries and lithium ion batteries, the negative electrode resistance is remarkably reflected in the high frequency region in the voltage curve, and the positive electrode resistance is remarkably reflected in the low frequency region. In the present embodiment 12, nickel-metal hydride batteries are used as the secondary batteries 21 to 26, and the battery characteristic acquisition unit 61 acquires a voltage curve in a predetermined voltage section in a high frequency region as the battery characteristic. The correspondence relationship memory unit 51 stores in advance the correspondence relationship between the voltage curve in the high frequency region as the battery characteristic and the negative electrode resistance. The other configuration elements are the same as in the case of the embodiment 11, and the same reference numerals are given and the description thereof will be omitted.

In the internal resistance having a correlation with the deterioration degree of the secondary batteries 21 to 26, the dominant resistance element differs depending on the deterioration mode. First, the internal resistance of the secondary battery is determined by the relationship among the three resistance components of electronic resistance, reaction resistance, and the resistance of internal material transfer, and the secondary battery can be considered to be a series equivalent circuit of the three resistance components. In general, the electronic resistance is a resistance component mainly generated in the time region immediately after a constant current is applied to a battery. The reaction resistance is a resistance component mainly generated in the time region after the time region in which the electronic resistance is generated. The internal material transfer resistance is generated when a constant current is applied for a long time, and is a resistance component mainly generated in the time region after the time region of the reaction resistance. The negative electrode reaction resistance dominant area is a temporal area in which the ratio of the reaction resistance of the negative electrode in a discharging period among the above three resistance components is the largest. In the corresponding negative electrode reaction resistance dominant area, the reaction resistance of the negative electrode predominantly determines the internal resistance of the secondary battery 2. In the present embodiment 12, the determination unit 63 determines the deterioration degree of the secondary batteries 21 to 26 based on the negative electrode resistance estimated by the resistance estimation unit 621 in the corresponding negative electrode reaction resistance dominant area.

In a method for determining the deterioration degree by the deterioration degree determination device 1 of the present embodiment 12, the steps S1 to S3 shown in FIG. 31 are performed as in the case of the embodiment 11. In the step S43, the resistance estimation unit 621 estimates the negative electrode resistance of the secondary batteries 21 to 26 based on the voltage curve acquired by the battery characteristic acquisition unit 61 and the correspondence relationship stored in the correspondence relationship memory unit 51. The determination unit 63 determines the deterioration degree of the secondary batteries 21 to 26 from the estimated negative electrode resistance. The present embodiment 12 also has the same operation effect as the operation effect of the embodiment 1.

Embodiment 13

In the deterioration degree determination device 1 of the embodiment 13, the resistance estimation unit 621 estimates the positive electrode resistance of the secondary batteries 21 to 26, and the determination unit 63 determines the deterioration degree of the secondary batteries 21 to 26. In the present embodiment 13, nickel-metal hydride batteries are used as the secondary batteries 21 to 26, and the battery characteristic acquisition unit 61 acquires a voltage curve in a predetermined voltage section in a low frequency region as the battery characteristic. The correspondence relationship memory unit 51 stores in advance the correspondence relationship between the voltage curve as the battery characteristic and the positive electrode resistance. The determination unit 63 determines the deterioration degree of the secondary batteries 21 to 26 based on the positive electrode resistance estimated by the resistance estimation unit 621 in the positive electrode reaction resistance dominant area. The other configuration elements are the same as in the case of the embodiment 12, and the same reference numerals are given and the description thereof will be omitted.

In a method for determining the deterioration degree by the deterioration degree determination device 1 of the present embodiment 13, the steps S1 to S3 shown in FIG. 31 are performed as in the case of the embodiment 12. In the step S43, the resistance estimation unit 621 estimates the positive electrode resistance of the secondary batteries 21 to 26 based on the voltage curve acquired by the battery characteristic acquisition unit 61 and the correspondence relationship stored in the correspondence relationship memory unit 51. The determination unit 63 determines the deterioration degree of the secondary batteries 21 to 26 from the estimated positive electrode resistance. The present embodiment 13 also has the same operation effect as the operation effect of the embodiment 1.

The present disclosure is not limited to each of the above embodiments, and can be applied to various embodiments without departing from the gist thereof.

Although the present disclosure has been described in accordance with the embodiments, it is understood that the present disclosure is not limited to such embodiments or structures. The present disclosure also includes various modified embodiments and a modification within an equivalent scope. Various combinations or forms as well as other combinations or forms including only one element, one or more elements, or one or fewer elements, fall within the scope or the spirit of the present disclosure.

The deterioration degree determination device 1 and the method described in the present disclosure may be implemented by a special purpose computer, which includes a memory and a processor programmed to execute one or more special functions implemented by computer programs of the memory. Alternatively, the deterioration degree determination device 1 and the method described in the present disclosure may be implemented by a dedicated computer configured as a processor with one or more dedicated hardware logic circuits. Alternatively, the deterioration degree determination device 1 and the method thereof described in the present disclosure may be implemented by one or more dedicated computers configured by a combination of a processor and a memory programmed to execute one or multiple functions and a processor configured by one or more hardware logic circuits. The computer program may also be stored in a computer readable non-transitory tangible storage medium as computer executable instructions. The deterioration degree determination device 1 and the method thereof described in the present disclosure do not necessarily need to include software, and all the functions may be implemented using one or more hardware circuits.

Multiple functions of one configuration element in the above embodiments may be implemented by multiple configuration elements, or a single function of one configuration element may be implemented by multiple configuration elements. Multiple functions of multiple configuration elements in the above embodiments may be implemented by one configuration element, or one function implemented by multiple configuration elements may be implemented by one configuration element. A part of the configurations of the above embodiments may be omitted as appropriate. At least a part of the configuration in one embodiment may be added to or substituted for the configuration of another embodiment.

In addition to the above deterioration degree determination device 1, the present disclosure can also be implemented in various forms, such as a system including the deterioration degree determination device 1 as an element, a program that controls a computer to function as deterioration degree determination device 1, a non-transitory tangible storage medium, such as a semiconductor memory in which the above-described program is recorded, and a deterioration degree determination method.

What is claimed is:

1. A secondary battery deterioration degree determination device, comprising:
a charging and discharging control unit that performs, in a state where a plurality of secondary batteries are connected to each other to form a battery pack, a charging and discharging operation of the battery pack while voltages of the secondary batteries are individually measured;
a battery characteristic acquisition unit that acquires a battery characteristic related to transition in a battery state over a predetermined voltage section for at least some of the plurality of secondary batteries; and
a determination unit that determines a deterioration degree of at least some of the plurality of secondary batteries based on the battery characteristic or a battery characteristic relationship value calculated based on the battery characteristic, wherein
the charging and discharging control unit is configured to perform the charging and discharging operation that includes at least one of (i) discharging until the voltage of at least one of the plurality of secondary batteries reaches a preset discharging target voltage that is set outside a preset normal use range of the secondary batteries that is a preset voltage range allowed when the secondary batteries are used or (ii) charging until the voltage of at least one of the plurality of secondary batteries reaches a preset charging target voltage that is set outside the preset normal use range, thereby to allow the voltage of the at least one of the plurality of secondary batteries to deviate from the preset normal use range in the charging and discharging operation of the battery pack, and
the determination unit determines the deterioration degree of the at least some of the plurality of secondary batteries based on the battery characteristics that are obtained by the charging and discharging operation including the at least one of (i) the discharging or (ii) the charging or the battery characteristic relationship value that is calculated based on the battery characteristics obtained by the charging and discharging operation.

2. The secondary battery deterioration degree determination device according to claim 1, wherein
the plurality of secondary batteries forming the battery pack include a secondary battery that is set with the predetermined voltage section for acquiring the battery characteristic different from a voltage section of another secondary battery of the plurality of secondary batteries.

3. The secondary battery deterioration degree determination device according to claim 2, wherein
the plurality of secondary batteries forming the battery pack include secondary batteries that are set with a voltage section common to each other as the predetermined voltage section for acquiring the battery characteristic.

4. The secondary battery deterioration degree determination device according to claim 1, wherein
the charging and discharging control unit is configured to allow the voltages of the plurality of secondary batteries to deviate from a preset usable range in the charging and discharging operation of the battery pack.

5. The secondary battery deterioration degree determination device according to claim 1, wherein
the battery characteristic acquisition unit, the determination unit, and the charging and discharging control unit are configured through a cloud service, and
the battery pack is configured to be connectable to the cloud service through a scan tool having a communication function.

6. The secondary battery deterioration degree determination device according to claim 1, wherein
the battery pack is for a vehicle, and
the charging and discharging control unit is configured to perform the charging and discharging operation in a state where the battery pack is mounted on the vehicle.

7. The secondary battery deterioration degree determination device according to claim 6, wherein
the charging and discharging control unit is configured to perform the charging and discharging operation via an apparatus mounted on the vehicle.

8. The secondary battery deterioration degree determination device according to claim 1, wherein
the determination unit determines the deterioration degree of the at least some of the plurality of secondary batteries based on the battery characteristic that is obtained in at least one of a discharging period from a starting time of the discharging to an end time of the discharging at which the voltage of at least one of the plurality of secondary batteries reaches the preset discharging target voltage or a charging period from a starting time of the charging to an end time of the charging at which the voltage of the at least one of the plurality of secondary batteries reaches the preset charging target voltage or the battery characteristic relationship value calculated based on the battery characteristic obtained in the at least one of the discharging period or the charging period.

9. The secondary battery deterioration degree determination device according to claim 1, wherein
in the discharging and charging operation, the discharging and charging control unit stops the at least one of (i) the discharging or (ii) the charging when the voltage of one of the secondary batteries reaches the target discharging voltage or the target charging voltage.

10. The secondary battery deterioration degree determination device according to claim 1, wherein
the battery characteristic includes at least one of a discharging voltage characteristic or a charging voltage characteristic, the discharging voltage characteristic being based on at least one of a voltage transition of a respective secondary battery when (i) the discharging until the discharging target voltage is performed or a voltage transition of the respective secondary battery after (ii) the discharging until the discharging target voltage is stopped, and the charging voltage characteristic being based on at least one of a voltage transition of the respective secondary battery when (i) the charging until the charging target voltage is performed or a voltage transition of the respective secondary battery after (ii) the charging until the charging target voltage is stopped.

11. The secondary battery deterioration degree determination device according to claim 1, wherein
the battery characteristic related to the transition in the battery state over the predetermined voltage section is calculated based on at least one of a section capacity of a respective secondary battery in the predetermined voltage section, a ratio of a voltage change of the respective secondary battery with respect to a capacity change of the respective secondary battery in the predetermined voltage section, or a ratio of a voltage change of the respective secondary battery with respect to an elapsed time in the predetermined voltage section.

12. The secondary battery deterioration degree determination device according to claim 1, further comprising:
a capacity estimation unit configured to estimate a total capacity of a respective secondary battery based on the battery characteristic as the battery characteristic relationship value, wherein
the determination unit determines the deterioration degree of the secondary battery based on an estimation result of the capacity estimation unit.

13. The secondary battery deterioration degree determination device according to claim 1, wherein
in the discharging of the discharging and charging operation, when the voltage of one of the secondary batteries first exceeds the discharging target voltage and reaches a usage limit lower limit which is a lower limit of a usable range of the secondary battery, the discharging and charging control unit continues (i) the discharging until the voltage of another one of the secondary batteries reaches the discharging target voltage and stops (ii) the discharging when the voltage of the another one of the secondary batteries reaches the discharging target voltage.

* * * * *